US00RE50388E

(19) United States
(12) Reissued Patent
d'Andrea et al.

(10) Patent Number: US RE50,388 E
(45) Date of Reissued Patent: Apr. 15, 2025

(54) SYSTEM AND METHOD FOR DISTRIBUTING COMMUNICATION REQUESTS BASED ON COLLABORATION CIRCLE MEMBERSHIP DATA USING MACHINE LEARNING

(71) Applicant: Fuze, Inc., Boston, MA (US)

(72) Inventors: Turchese d'Andrea, Boston, MA (US); Alexander DiNunzio, Cambridge, MA (US); Nancy Ng Huang, Stoneham, MA (US); Keith Johnson, Wellesley, MA (US)

(73) Assignee: 8x8, Inc., Campbell, CA (US)

(21) Appl. No.: 17/715,774

(22) Filed: Apr. 7, 2022

Related U.S. Patent Documents

Reissue of:
(64) Patent No.: 10,616,369
Issued: Apr. 7, 2020
Appl. No.: 15/945,441
Filed: Apr. 4, 2018

(51) Int. Cl.

| | |
|---|---|
| ***G06N 20/20*** | (2019.01) |
| ***G06N 20/00*** | (2019.01) |
| ***H04L 29/06*** | (2006.01) |
| ***H04L 29/08*** | (2006.01) |
| ***H04L 65/403*** | (2022.01) |
| ***H04L 67/55*** | (2022.01) |
| ***H04L 67/60*** | (2022.01) |

(Continued)

(52) U.S. Cl.
CPC ..... *H04L 67/60* (2022.05); *G06N 20/00* (2019.01); *H04L 65/403* (2013.01); *H04L 67/55* (2022.05)

(58) Field of Classification Search
CPC ..... G06Q 10/109; G06Q 10/063112; H04L 65/1069; H04L 67/60; H04L 12/1822; H04L 65/403; H04L 67/55; H04L 67/54; H04L 51/224; G06N 20/00; G06N 20/20; G06N 3/126; G06N 7/01; G06N 20/10; G06N 5/01; G06N 3/08
See application file for complete search history.

(56) References Cited

U.S. PATENT DOCUMENTS

| | | | |
|---|---|---|---|
| 6,061,433 | A | 5/2000 | Polcyn et al. |
| 7,065,188 | B1 | 6/2006 | Mei et al. |

(Continued)

FOREIGN PATENT DOCUMENTS

| | | | |
|---|---|---|---|
| EP | 2779538 | A1 | 9/2014 |
| GB | 2546433 | A | 7/2017 |
| WO | 2010069567 | A1 | 6/2010 |

*Primary Examiner* — David E England
(74) *Attorney, Agent, or Firm* — Crawford Maunu PLLC

(57) ABSTRACT

Various aspects of the subject technology related to systems, methods, and a machine readable storage medium for distributing communication requests based on collaboration circle membership data using machine learning. A system may be configured to receive a plurality of communication requests. Each communication request may include a request initiator and a request recipient. The system may process the plurality of communication requests to using one or more predictive models derived from a machine learning process to generate a communication request resolution for each of the plurality of communication requests. The system may forward a communication request notification to a request facilitator to implement the generated communication request resolution.

24 Claims, 8 Drawing Sheets

(51) Int. Cl.
*H04M 3/51* (2006.01)
*H04M 3/523* (2006.01)

(56) References Cited

U.S. PATENT DOCUMENTS 7,369,653 B2 * 5/2008 Dezonno ..... H04M 3/523 379/265.01
7,457,404 B1 11/2008 Hession et al.
7,602,900 B1 10/2009 Croak et al.
7,747,695 B1 * 6/2010 Morris ..... G06F 9/542 705/5
7,979,840 B2 7/2011 Zhang et al.
7,983,401 B1 * 7/2011 Krinsky ..... H04M 3/527 455/466
8,316,347 B2 11/2012 Arsanjani et al.
8,332,813 B2 12/2012 Arasanjani et al.
8,468,244 B2 6/2013 Redlich
8,600,034 B2 12/2013 Teitelman et al.
8,605,878 B2 12/2013 Claudatos et al.
8,739,111 B2 5/2014 Allam et al.
8,750,123 B1 6/2014 Alisawi et al.
8,874,755 B1 10/2014 Deklich et al.
9,031,222 B2 5/2015 Wolfeld
9,053,211 B2 6/2015 Goldfarb
9,077,746 B2 7/2015 Chandrshekhar
9,112,974 B1 8/2015 Wilsie et al.
9,160,853 B1 10/2015 Daddi
9,160,854 B1 10/2015 Daddi et al.
9,171,319 B2 10/2015 Qu et al.
9,178,999 B1 11/2015 Hegde et al.
9,213,564 B1 12/2015 Klein et al.
9,392,049 B2 7/2016 Ennis et al.
9,542,832 B1 1/2017 Fu et al.
9,552,512 B2 1/2017 Guo et al.
9,602,666 B2 3/2017 Ponting et al.
9,717,017 B2 7/2017 Backholm et al.
9,848,082 B1 12/2017 Lillard et al.
9,936,066 B1 4/2018 Mammen et al.
9,953,539 B1 * 4/2018 Gkiotsalitis ..... G06N 20/00
10,021,590 B2 7/2018 Backholm et al.
10,027,803 B2 7/2018 Krinsky et al.
10,096,063 B2 10/2018 Dahlwadkar
10,194,027 B1 1/2019 Daddi et al.
10,198,427 B2 2/2019 Yishay
10,257,355 B1 * 4/2019 Merritt ..... H04M 3/5232
10,282,791 B2 5/2019 O'Neil
10,394,975 B2 8/2019 Kim et al.
10,419,609 B1 * 9/2019 Harris ..... H04M 3/493
10,433,243 B2 10/2019 Lopes et al.
10,546,008 B2 1/2020 Yishay
10,573,312 B1 * 2/2020 Thomson ..... G10L 15/22
10,574,822 B1 2/2020 Sheshaiahgari et al.
10,608,929 B2 3/2020 Zaslow et al.
10,614,107 B2 4/2020 Yishay
10,616,369 B1 * 4/2020 d'Andrea ..... G06Q 10/109
10,642,889 B2 * 5/2020 Reshef ..... G10L 15/04
10,666,799 B2 5/2020 Kazerani et al.
10,944,800 B1 3/2021 Arsanjani et al.
10,949,619 B1 3/2021 Arsanjani et al.
11,025,488 B1 6/2021 Arsanjani et al.
11,140,110 B2 10/2021 Kasireddy et al.
11,272,063 B1 * 3/2022 Kliebhan ..... H04L 65/1069
2003/0187868 A1 10/2003 Igarashi
2004/0064517 A1 4/2004 Uenoyama et al.
2004/0098274 A1 5/2004 Dezonno et al.
2004/0122245 A1 6/2004 Franks
2005/0141479 A1 * 6/2005 Ozugur ..... H04L 51/04 370/351
2005/0152511 A1 7/2005 Stubley
2005/0246211 A1 11/2005 Kaiser
2006/0069686 A1 * 3/2006 Beyda ..... G06Q 30/02
2006/0075091 A1 * 4/2006 Beyda ..... H04L 67/60 709/224
2006/0233347 A1 10/2006 Tong et al.
2006/0285670 A1 12/2006 Chin
2007/0025537 A1 2/2007 Claudatos
2007/0025539 A1 2/2007 Claudatos
2008/0027784 A1 1/2008 Ang et al.
2008/0082341 A1 4/2008 Blair
2008/0130842 A1 6/2008 Johri
2008/0140348 A1 6/2008 Frank
2008/0214219 A1 9/2008 Matsushima
2008/0219429 A1 * 9/2008 Mandalia ..... H04M 3/5175 379/265.09
2009/0083768 A1 3/2009 Hatalkar et al.
2009/0192861 A1 * 7/2009 Suzuki ..... G06Q 10/109 705/7.19
2009/0254404 A1 10/2009 Eggenberger
2009/0254572 A1 10/2009 Redlich et al.
2009/0292583 A1 * 11/2009 Eilam ..... G06Q 40/02 705/7.31
2009/0306984 A1 12/2009 Mark et al.
2009/0327172 A1 12/2009 Liu et al.
2010/0197329 A1 8/2010 Claudatos et al.
2010/0250497 A1 9/2010 Redlich et al.
2011/0305331 A1 12/2011 Hughes et al.
2013/0254152 A1 * 9/2013 Zhang ..... G06Q 30/0631 706/46
2014/0012826 A1 1/2014 Wisman et al.
2014/0064072 A1 3/2014 Ludwig
2014/0064202 A1 3/2014 Norstrom et al.
2014/0120981 A1 5/2014 King et al.
2014/0244652 A1 8/2014 O'Neil
2014/0304365 A1 10/2014 Khanna
2014/0324420 A1 10/2014 Sorensen et al.
2015/0046514 A1 2/2015 Madan et al.
2015/0170674 A1 6/2015 Ishibashi
2015/0242513 A1 8/2015 Sanghavi et al.
2015/0243155 A1 8/2015 Xiong et al.
2015/0294377 A1 * 10/2015 Chow ..... G06Q 30/0263 705/347
2015/0363563 A1 12/2015 Hallwachs
2015/0373196 A1 12/2015 Scott et al.
2016/0036869 A1 2/2016 Logan et al.
2016/0036972 A1 2/2016 Ristock et al.
2016/0080428 A1 3/2016 Fan et al.
2016/0127553 A1 5/2016 McCormack et al.
2016/0140125 A1 * 5/2016 Goyal ..... G06F 16/90324 707/751
2016/0182718 A1 6/2016 Yoakum et al.
2016/0188960 A1 6/2016 Guo et al.
2016/0227431 A1 8/2016 Alisawi
2016/0350674 A1 * 12/2016 Midboe ..... H04L 67/63
2016/0360039 A1 12/2016 Sanghavi et al.
2016/0364488 A1 12/2016 Shen et al.
2017/0011740 A1 1/2017 Gauci
2017/0019529 A1 1/2017 Bostick et al.
2017/0068906 A1 * 3/2017 Korycki ..... G06N 20/00
2017/0104876 A1 4/2017 Hibbard et al.
2017/0169325 A1 * 6/2017 McCord ..... H04M 3/5235
2017/0214779 A1 7/2017 Moran et al.
2017/0236148 A1 * 8/2017 James ..... G06F 16/335 705/14.45
2017/0257303 A1 9/2017 Boyapalle et al.
2017/0262164 A1 9/2017 Jain et al.
2018/0020093 A1 * 1/2018 Bentitou ..... H04M 3/4365
2018/0032576 A1 2/2018 Romero
2018/0041378 A1 * 2/2018 Yan ..... H04W 24/04
2018/0047072 A1 2/2018 Chow
2018/0054524 A1 * 2/2018 Dahan ..... H04M 3/5231
2018/0082112 A1 3/2018 Keller
2018/0176281 A1 6/2018 Arunachalam et al.
2018/0184140 A1 6/2018 Danker et al.
2018/0184171 A1 * 6/2018 Danker ..... H04N 5/272
2018/0302761 A1 * 10/2018 Rizzolo ..... H04L 12/1822
2018/0309708 A1 10/2018 Potvin
2018/0324041 A1 11/2018 Deklich et al.
2019/0012251 A1 1/2019 Khosrowpour et al.
2019/0042988 A1 * 2/2019 Brown ..... G06F 16/9535
2019/0065684 A1 * 2/2019 Hayward ..... G06N 5/04
2019/0243836 A1 8/2019 Nanda et al.
2019/0253520 A1 8/2019 Maharana et al.
2019/0327130 A1 10/2019 Huang et al.
2019/0342718 A1 11/2019 Pylappan et al.

(56) References Cited

U.S. PATENT DOCUMENTS

| | | | |
|---|---|---|---|
| 2019/0349426 | A1 | 11/2019 | Smith et al. |
| 2020/0092293 | A1 | 3/2020 | Liu et al. |
| 2020/0133629 | A1 | 4/2020 | Pratt et al. |

* cited by examiner

305

| |
|---|
| Communication Circle Profile-Recipient 120A |
| Location: HQ, Bldg A, Flr 9, Desk 701 |
| Org: Product Mgmt (PM), Sales |
| Position: Senior Product Mgr; Level: LIII |
| Admin Settings: No |
| External Availability Status: Public to all |
| Unit Membership(s): |
| 1) PM (125A) -Line 617-345-8900 |
| Availability Status-Internal: Public, 9am-5pm |
| Availability Status-External: Private, 5pm-9am |
| 2) Sales (125C)-Line 800-245-8300 |
| Availability Status-All: Public, 24/7 |
| 3) Self -Line 617-345-8905; 617-458-7892 cell |
| Availability Status-All: Public, 9am-5pm |

310

| |
|---|
| Communication Circle Profile-Recipient 120B |
| Location: LA, Bldg 12, Flr 2, Desk 234 |
| Org: Product Mgmt (PM), Sales |
| Position: Product Mgr; Level: LI |
| Admin Settings: No |
| External Availability Status: Private to all |
| Unit Membership: |
| 1) PM (125A) -Line 617-345-8900 |
| Availability Status-Internal: Public |
| 2) Sales (125C)-Line 800-245-8300 |
| Availability Status-Internal: Public, 9am-5pm |
| 3) Self -Line 213-589-5896 |
| Availability Status-All: Public, 9am-5pm |

315

| |
|---|
| Communication Circle Profile-Recipient 120C |
| Location: DC, Jada Bldg, Desk 205 |
| Org: Sales, Support |
| Position: Sales/Support Manager; Level: LII |
| Admin Settings: No |
| External Availability Status: Public to all |
| Unit Membership(s): |
| 1) Sales (125C)-Line 800-245-8300 |
| Availability Status-All: Public, 9am-9pm |
| 2) Support (125B) -Line 800-668-9000 |
| Availability Status-Internal: Public, 9am-5pm |
| Availability Status-External: Private, 5pm-9am |
| 3) Self-Line 202-478-9852; 202-854-5941cell |
| Availability Status-All: Public, 9am-5pm |

320

| |
|---|
| Communication Circle Profile-Recipient 120D |
| Location: DC, Jada Bldg, Desk 112 |
| Org: Support |
| Position: Support Specialist; Level: LI |
| Admin Settings: Yes |
| External Availability Status: Private to all |
| Unit Membership(s): |
| 1) Support (125B) -Line 800-668-9000 |
| Availability Status-Internal: Public, 9am-5pm |
| 2) Self-Line 202-478-5689 |
| Availability Status-All: Public, 9am-5pm |

325

| |
|---|
| Communication Circle Profile-Support Team 125B |
| Availability Status: Public to all |
| Admin within Team: Recipient 120D |
| Unit Members: |
| 1) Recipient 120C-Sales/Support Manager; LII, Admin=N |
| 2) Recipient 120D-Support Specialist; LI, Admin=Y |

Figure 3

SYSTEM AND METHOD FOR DISTRIBUTING COMMUNICATION REQUESTS BASED ON COLLABORATION CIRCLE MEMBERSHIP DATA USING MACHINE LEARNING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present disclosure generally relates to a communication platform that is operable to distribute communication requests to recipients based on collaboration circle membership data using machine learning to predict communication request resolutions. The present disclosure further relates to systems and methods for managing communications within electronic and telephonic data systems.

BACKGROUND

Facilitating communication experiences requires increasingly complex technology as the myriad of communication forms embodying the communication experience also increases. Communication requests may be created by individuals or entities who are either internal to or external to members of an organization who may receive the communication request. Facilitating communication between a sender or initiator and a receiver or recipient often requires parity in the communication tool or application used by the sender and the receiver. For example, a telephone call from a customer may be received by a company phone operator and the telephone call may be re-routed or distributed as a phone call to the employee of the company best suited to answer the customer's telephone call. As more complex communication mediums and methods become available, the role of a communication facilitator, such as a call attendant or corporate call center, becomes increasingly complex in order to distribute and facilitate communication experiences in an intelligent manner. While software-based telephony systems may provide some degree of automation to forward and distribute telephone communications, they do not provide intelligent distribution of disparate communication methods such as electronic mail, instant messaging, text messaging, push notifications, video calls or video collaboration sessions, audio notes or voice recordings, meeting invitations, or calendar entries as communication methods. In addition, the structure or organization of collaborating individuals within a company is often not included in the design of intelligent communication platforms or solutions. Functionality such as shared telephone lines or email distribution groups may facilitate communications within a group of individuals, but they do not facilitate communications based on the availability of an individual to receive a communication or the communication preferences of the individual receiving a communication.

The description provided in the background section should not be assumed to be prior art merely because it is mentioned in or associated with the background section. The background section may include information that describes one or more aspects of the subject technology.

SUMMARY

The disclosed system provides for distributing communication requests based on collaboration circle membership data using machine learning. The system includes memory storing comprising instructions and one or more processors that are configured to execute the instructions. The instructions, when executed, cause the one or more processors to receive a plurality of communication requests. Each of the received communication requests includes a request initiator and a request recipient. The processors are further configured to process the plurality of communication requests using one or more predictive models derived from at least one machine learning process to generate a communication request resolution for each of the plurality of communication requests. The processors are further configured to generate the communication request resolution by determining the request initiator and the request recipient, the request recipient being a member of one or more collaboration circles. The processors are further configured to generate the communication request resolution by determining an availability status of the request recipient. The availability status of the request recipient is included in one or more collaboration circle profiles associated with the request recipient. The processors are further configured to generate the communication request resolution by determining a request facilitator associated with the request recipient based on the availability status of the request recipient. The processors are further configured to generate the communication request resolution by determining one or more notification preferences associated with the request facilitator. The processors are further configured to generate the communication request resolution by generating a communication request notification to the request facilitator based on the one or more notification preferences. The processors are further configured to forward the communication request notification to the request facilitator to implement the generated communication request resolution.

According to certain aspects of the present disclosure, a method for distributing communication requests based on collaboration circle membership data using machine learning is provided. The method includes receiving a plurality of communication requests. Each of the received communication requests includes a request initiator and a request recipient. The method also includes processing the plurality of communication requests using one or more predictive models derived from at least one machine learning process to generate a communication request resolution for each of the plurality of communication requests. The method also includes generating the communication request resolution by determining the request initiator and the request recipient, the request recipient being a member of one or more collaboration circles. The method also includes generating the communication request resolution by determining an availability status of the request recipient. The availability status of the request recipient is included in one or more collaboration circle profiles associate with the request recipient. The method also includes generating the communication request resolution by determining a request facilitator associated with the request recipient based on the availability status of the request recipient. The method also includes generating the communication request resolution by determining one or more notification preferences associated with the request facilitator. The method also includes generating the communication request resolution by generating a communication request notification to the request facilitator based on the one or more notification preferences. The method also includes forwarding the communication request notification to the request facilitator to implement the generated communication request resolution.

According to certain aspects of the present disclosure, a machine readable storage medium containing program instructions for causing a computer to distribute communication requests based on collaboration circle membership data using machine learning is provided. The program instructions contained on the machine readable storage medium perform the method, including receiving a plurality of communication requests. Each of the received communication requests includes a request initiator and a request recipient. The program instructions further perform the method including processing the plurality of communication requests using one or more predictive models derived from at least one machine learning process to generate a communication request resolution for each of the plurality of communication requests. The program instructions further perform the method, including generating the communication request resolution by determining the request initiator and the request recipient, the request recipient being a member of one or more collaboration circles. The program instructions further perform the method, including generating the communication request resolution by determining an availability status of the request recipient. The availability status of the request recipient is included in one or more collaboration circle profiles associated with the request recipient. The program instructions further perform the method, including generating the communication request resolution by determining a request facilitator associated with the request recipient based on the availability status of the request recipient. The program instructions further perform the method, including generating the communication request resolution by determining one or more notification preferences associated with the request facilitator. The program instructions further perform the method, including generating the communication request resolution by generating a communication request notification to the request facilitator based on the one or more notification preferences. The program instructions further perform the method including forwarding the communication request notification to the request facilitator to implement the generated communication request resolution.

According to certain aspects of the present disclosure, a system is provided. The system includes a means for receiving a plurality of communication requests. Each of the received communication requests includes a request initiator and a request recipient. The system includes a means for processing the plurality of communication requests using one or more predictive models derived from at least one machine learning process to generate a communication request resolution for each of the plurality of communication requests. The system includes a means for generating the communication request resolution by determining the request initiator and the request recipient, the request recipient being a member of one or more collaboration circles. The system includes a means for generating the communication request resolution by determining an availability status of the request recipient. The availability status of the request recipient is included in one or more collaboration circle profiles associated with the request recipient. The system includes a means for generating the communication request resolution by determining a request facilitator associated with the request recipient based on the availability status of the request recipient. The system includes a means for generating the communication request resolution by determining one or more notification preferences associated with the request facilitator. The system includes a means for generating the communication request resolution by generating a communication request notification to the request facilitator based on the one or more notification preferences. The system includes a means for forwarding the communication request notification to the request facilitator to implement the generated communication request resolution.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments, and together with the description serve to explain the principles of the disclosed embodiments. In the drawings:

FIG. 3 is a diagram illustrating a plurality of collaboration circle profiles for use in distributing communication requests using machine learning, according to certain aspects of the disclosure.

Figure 1:
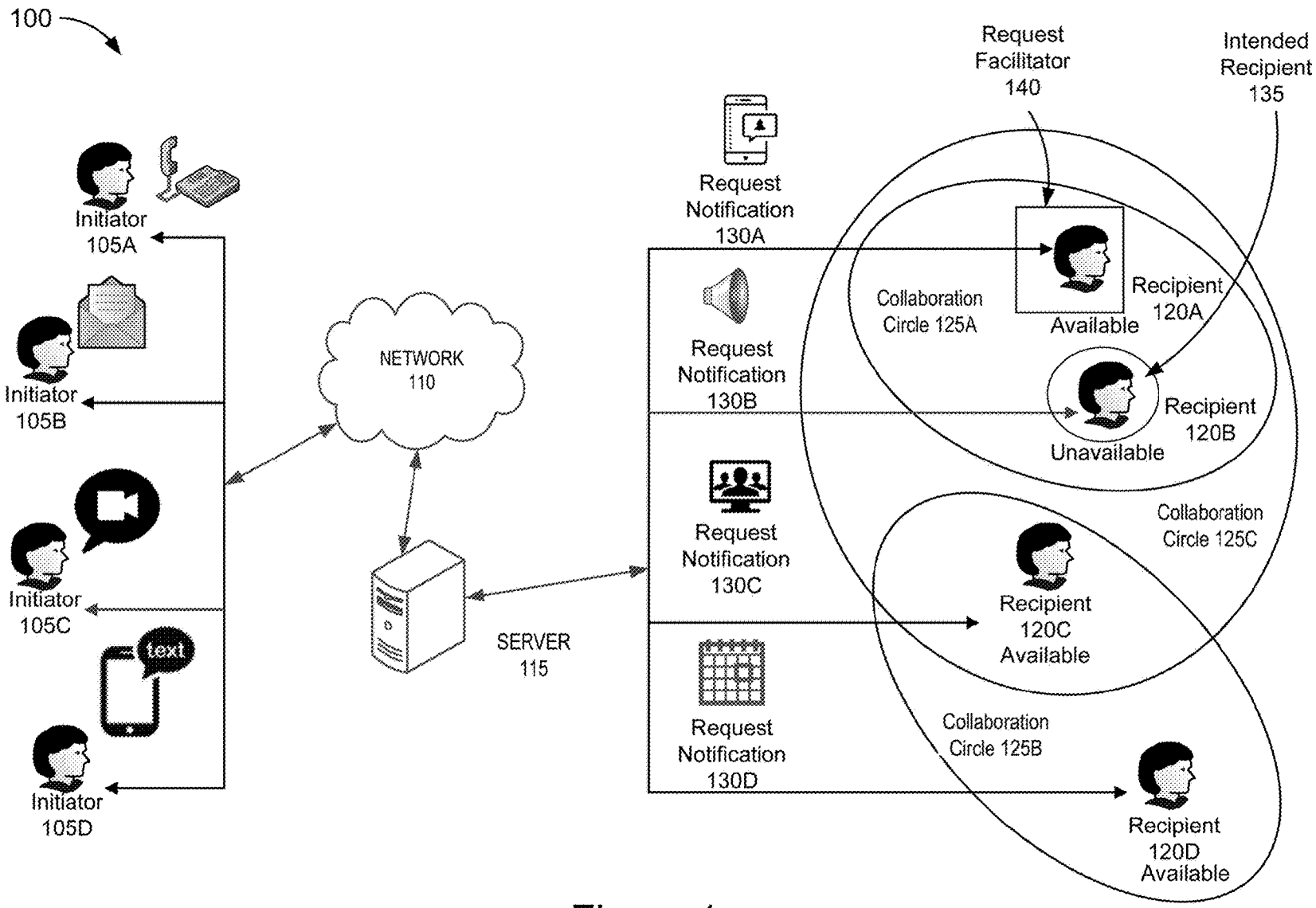
FIG. 1 illustrates an example architecture for distributing communication requests based on collaboration circle membership data using machine learning.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system and method provides for distributing communication requests based on collaboration circle membership data using machine learning. Communication requests are received, stored, processed, and distributed by the server of an intelligent communication platform or system in near real-time. The communication requests may include telephone calls, email messages, text messages, instant messages, push notifications, meeting or calendar invites, video calls, video collaboration sessions, video recordings, audio notes or other audio recordings, and communication requests or content generated from social media applications. The communication requests are processed using one or more prediction models derived in a machine learning process in order to determine an appropriate resolution to the communication request. The communication request resolution is predictively determined based on data associated with the request recipient, such as the presence or availability status of the request recipient to receive the communication request. In some implementations, the communication request resolution is predictively determined based on the request recipient's membership in a particular business unit or collaboration group. Based on analysis of live data and historical communication patterns, the server may intelligently predict the best recipient to facilitate or receive the communication request if the recipient to whom the communication was originally intended is unavailable. The communication request may then be distributed to the facilitating recipient by providing a notification message of the communication request, according to the facilitating recipient's communication preferences and availability status. The facilitating recipient may take action on the notification message to complete the resolution of the communication request by facilitating an interaction or experience with the individual who created or initiated the communication request.

In some implementations, an intended recipient may be available to receive a communication request, and the server may forward the communication request to the intended recipient. Upon receiving the communication request, the intended recipient may decide to ignore or redirect the communication request back to the server. The server may then determine a next best recipient or a recipient directly identified by the intended recipient who chose to ignore or redirect the communication request. The server may learn over time, based on the actions of the intended recipient to redirect or ignore certain communication requests, a different recipient is more suitable to receive particular communication requests. As a result, the server would forward future communication requests to the more suitable request recipient based on the historical actions of the intended request recipient.

The disclosed system provides an improvement to computer functionality by allowing computer performance of a function not previously performed by a computer. Specifically, the disclosed system provides for distributing communication requests based on collaboration circle membership data using machine learning. In any size organization, it can be difficult to determine an alternate recipient who is best suited to receive the communication request when an intended recipient is unavailable. Determining the alternate recipient's preferred format for communication interactions or requests is also difficult to automatically determine as these are often individual preferences that are not supported configurations across disparate applications that may be used to generate a variety of formats of communication requests. Often manual intervention, such as an administrative assistant, is necessary to translate communication requests to an intended recipient that are received in one format into a communication request format preferred by an alternate recipient who is supporting the communication interaction with the initiator of the communication request. The disclosed system and method solve this problem by determining and predicting how to distribute communication requests to recipients based on analysis of live and historical data associated with a request initiator, a request recipient, and collaboration circle profile data which may further include presence or availability status, request notification preferences, and collaboration circle membership data.

A solution to this problem is proposed in an intelligent communication platform employing a machine learning process to train predictive models capable of predicting and generating communication requests resolutions for received communication requests by using a wide variety of data as inputs to the trained prediction models, such as data associated with a request initiator, a request recipient, or data associated with one or more collaboration circles that a request recipient (and/or a request initiator) may be a member of. The benefit of this platform and the solutions configured therein provide organizations with greater insight about how to enhance and efficiently facilitate communication experiences with customers or other organization members based on the live user data and historical communication patterns. The communication request resolutions generated by the platform may also provide organizations with further insight regarding how best to internally structure, configure, or arrange teams of resources or members of the teams based on the communication patterns and experiences collected using the platform. In addition, the platform reduces the level of effort needed to actively complete communication requests by combining availability status, collaboration circle membership data, and the generation of recipient-specific request notifications. In this way, resolutions to communication requests can adapt to a diverse configuration of communication initiators and communication recipients, as well as accelerating or simplifying communication resource provisioning and facilitating data aggregation to enhance the resolution and overall experience of future communication requests.

The intelligent communication platform provides these solutions using a machine learning process capable of generating a trained prediction model that may be used to predictively determine a communication request resolution based on a variety of data. To generate the trained prediction model, a machine learning process iteratively inputs selected subsets of data features related to communication request initiators and communication request recipients, as well as historical patterns of handling and distributing communication requests as training data to a machine learning algorithm. Once a new prediction model has been trained in the machine learning process, the new prediction model can be deployed, for example, stored in memory, or configured on the processor of a computing device, in an intelligent communication platform in a business setting, and used to predict a communication request resolution for new communication requests in the future. The deployed prediction model may receive a variety of data as inputs and determine a communication request resolution based on the input data. The determined communication request resolution can be output in a variety of scenarios or configurations, including outputting and forwarding a communication request notification to a computing device used by a request facilitator for display on a user interface, and/or outputting the communication request resolution to a database, such as a historical data module or database that may be further used as training input in the machine learning process.

An intelligent communication platform, as disclosed herein, reduces the number of processing resources required in an organization by consolidating the functionality of multiple stand-alone communication systems into a single integrated platform. The disclosed intelligent communication platform also reduces server memory consumption by providing an integrated configuration of aggregated data sources instead of multiple large, distributed databases that need to be specifically configured in order to inter-operate with each of the disparate, stand-alone communication systems that may be required to facilitate such a wide variety of communication methods. The intelligent communication platform utilizes machine learning to predictively determine the distribution of different communication methods and thus eliminates additional processing, computing resources, and man-power required to distribute communications from multiple disparate communication systems.

While many examples are provided herein in the context of a corporation, the principles of the present disclosure contemplate other types of organizations as well. For example, non-profit, institutional, and governmental entities (e.g., administrative or military) are all considered within the scope of the present disclosure. An organization may also be a consortium of schools and/or campuses. In general terms, an organization is an operating unit and is, itself, made up of different operating units that may correspond to business units, departments, product teams, cross-functional teams, sub-departments, etc. The systems and methods described herein do not require any particular arrangement of entities or operating units but, instead, allow the organization to model its resources and processes into a hierarchy of operating units for purposes of communication planning, management, reporting, and distribution. The systems and methods described herein can also apply to any group of users, such as an ad-hoc group of individuals or users who are communicating amongst themselves and sharing communications between individuals.

Example System Architecture

FIG. 1 illustrates an example architecture 100 for distributing communication requests based on collaboration circle membership data using machine learning. The architecture 100 includes request initiators 105A-105D, a network 110, a server 115, request recipients 120A-120D, collaboration circles 125A-125C, request notifications 130A-130C, an intended recipient 135, and a request facilitator 140.

The architecture 100 illustrated in FIG. 1, enables communication requests that are initiated by request initiators, such as request initiators 105A-105D to be received and processed in an intelligent communication platform using a machine learning process to generate a resolution to the communication request. In broad terms, a communication request can include any form of communication in which one individual, such as a request initiator, wishes to communicate with another individual, such as a request recipient. For example, a communication request may include, but is not limited to, a phone call, an email message, a video call, and/or a text or instant message. It will be appreciated that as new modes of communication are developed the platform may be adapted to process new formats of communication requests beyond those identified above. For example, future communication request formats may include haptic, tactile, gesture-based, and face or voice recognition inputs as an example of future communication request formats. A request initiator generates or initiates a communication request to a request recipient, such as request recipients 120A-120D. The intelligent communication platform may be configured on a server, such as server 115, to receive communication requests transmitted over a network from one or more request initiators and process the communication requests to generate a resolution for each of the received communication requests. The intelligent communication platform may utilize data associated with the intended request recipient (e.g., intended recipient 135) and/or data associated with the request initiator in order to generate a resolution to the communication request. The resolution may include a request notification provided to a request facilitator (e.g., request facilitator 140). The request facilitator may be identified by the intelligent communication platform based on machine learning methods applied to data associated with the request recipient and/or data associated with one or more collaboration circles for which the request recipient is a member of, such as a request recipient 120's availability status. For example, a request recipient may have an availability status such as "available", "busy" or "unavailable", "in a meeting", "in a call", or "presenting". A collaboration circle may be configured to define formal relationships between one or more request recipients, including predefined organizational relationships, such as a collaboration circle associated with the "Sales" team within a corporation. Collaboration circles may also be configured to define informal relationships between one or more request recipients, such as project-based relationships that are formed more dynamically. Collaboration circle membership data may be stored in individual and business unit collaboration circle profiles and be utilized to influence how communication requests should be resolved.

As shown in FIG. 1, architecture 100 includes one or more request initiators and one or more request recipients. Request initiators may be referred to individually as request initiators 105A, 105B, 105C, or 105D, or collectively as request initiators 105. A communication request is generated by any of initiators 105 as a method of communication with an intended request recipient. As shown in FIG. 1, one or more request recipients may receive a communication request from request initiators 105. Request recipients may be referred to individually as request recipient 120A, 120B, 120C, or 120D, or collectively as request recipients 120. Request initiators 105 may include client computing devices or client computing systems that are configured to initiate and forward a communication request, including a phone call (e.g., the communication request from request initiator 105A), an email message (e.g., the communication request from initiator request 105B), a video call (e.g., the communication request from request initiator 105C), or a text message (e.g., the communication request from request initiator 105D), as shown in FIG. 1. In addition, a communication request may also include an audio note, a video collaboration session, a meeting invite, or a push notification.

Communication requests may be transmitted to their intended recipients through a network, such as network 110. The network 110 connects request initiators 105 to request recipients 120. The server 115 operates to receive, store, and process the communication requests generated by request initiators 105, as well as responses to the communication requests generated by request recipients 120. The server 115 may include memory and one or more processors configured to execute instructions, that when executed, the instructions cause the processors to distribute communication requests based on collaboration circle membership data using machine learning. Server 115 may be configured to host an intelligent communication platform, including a system for distributing communication requests based on collaboration circle membership data using machine learning as disclosed herein. For purposes of load balancing, multiple servers 115 may host the system for distributing communication requests using machine learning. To achieve high-throughput and high-availability for processing communication requests in real-time or near real-time, multiple servers 115 may be configured in a cloud computing architecture to efficiently process and predict communication request resolutions for global organizations where team members in a particular collaboration circle may be distributed around the world. As will be discussed herein, the intelligent communication platform enables communication requests to be received and processed by the server 115 so that a communication resolution may be generated based on collaboration circle data using one or more predictive models in a machine learning process.

As further shown in FIG. 1, the server 115 processes the communication requests from request initiators 105 and generates one or more communication request notifications. For example, as shown in FIG. 1, server 115 may generate communication request notifications such as a push notification (e.g., request notification 130A), an audio note (e.g., request notification 130B), a video collaboration session (e.g., request notification 130C), and a meeting invitation (e.g., request notification 130D). Additionally, or alternatively, the communication request may include a phone call, an email message, a video call, or a text message. The communication request notifications may be individually identified as communication request notification 130A, 130B, 130C, or 130D, and collectively referred to as communication request notifications 130.

The type of communication request notifications 130 generated by the server 115 may be determined as a result of the machine learning process. The generated communication request notifications 130 may further correspond to collaboration circle data defined in a collaboration circle profile for the intended request recipient or the determined request facilitator. The generated communication request notifications 130 may also correspond to collaboration circle data defined in a collaboration circle profile for the business unit or project team associated with a collaboration circle.

As shown in FIG. 1, the architecture 100 includes three collaboration circles which will individually be referred to as collaboration circle 125A, 125B, or 125C, and collectively referred to as collaboration circles 125. Collaboration circles 125 define relationships within an organization in which one or more request initiators and/or request recipients 120 collaborate. For example, as shown in FIG. 1, recipients 120A and 120B are each members of collaboration circle 125A. Request recipients 120C and 120D are members of collaboration circle 125B. Recipient 120C is also member of collaboration circle 125C, as are recipients 125A and 125B. Collaboration circles 125 may be created to correspond to organizational teams within a company, for example, a sales team, a customer support team, a product marketing team, or an executive team. Collaboration circles 125 may also be created to correspond to more ad-hoc or dynamically formed teams such as a project team or event team. Members of a collaboration circle share tools, controls, and/or functionality related to distributing communication requests to other members of the collaboration circle. By sharing these tools and controls, communication experiences for request recipients can be enhanced and legacy tools or controls, such as shared line appearance, buddy watch functionality, and/or pick-up groups used in telephone solutions, may be obsoleted. Members of one or more collaboration circles 125 may have communication preferences stored in a collaboration circle profile associated with the collaboration circle. For example, a collaboration circle profile may include a request notification preference describing the format in which a request recipient 120 wishes to receive a communication request as a member of the collaboration circle. In addition, a request recipient 120 may be included in a collaboration circle such that they are the only member of the collaboration circle. In such instances, the collaboration circle profile may include communication preferences associated with the request recipient 120 for communications that occur outside of the context of a particular collaboration circle. The collaboration circle profile may include data such as the request recipient's location and contact information. The collaboration circle profile data may also include data specifying a request recipient 120's presence or availability settings in regard to communication requests received from request initiators 105 who are inside and outside the collaboration circle or inside or outside the organization in which the intelligent communication platform is configured to operate. The collaboration circle profile data may also include user level data, such as a user's administrative settings and data describing the membership of other collaboration circles for which the recipient is a member.

The collaboration circle profile data may be used by the intelligent communication platform operating on server 115 to determine a communication request notification 130 to be generated when the intended request recipient 135 (shown as a solid line circle surrounding request recipient 120B) is unavailable. Based on one or more predictive models derived from a machine learning process, the server 115 forwards the communication request notification 130A to the request facilitator 140 (shown as a solid line square surrounding request recipient 120A). The intelligent communication platform leverages a variety of information about the request format, the request content, the request initiator 105, the intended request recipient 135, collaboration circle profile data, as well as information included in one or more aggregated data sources to predictively determine an appropriate request facilitator 140 and corresponding request notification 130 when an intended recipient 135 is not available to receive a communication request from the request initiator 105. In this way, the intelligent communication platform may intelligently resolve communication requests to improve the overall communication experience between communication request initiators 105 and request recipients 120.

Figure 2:
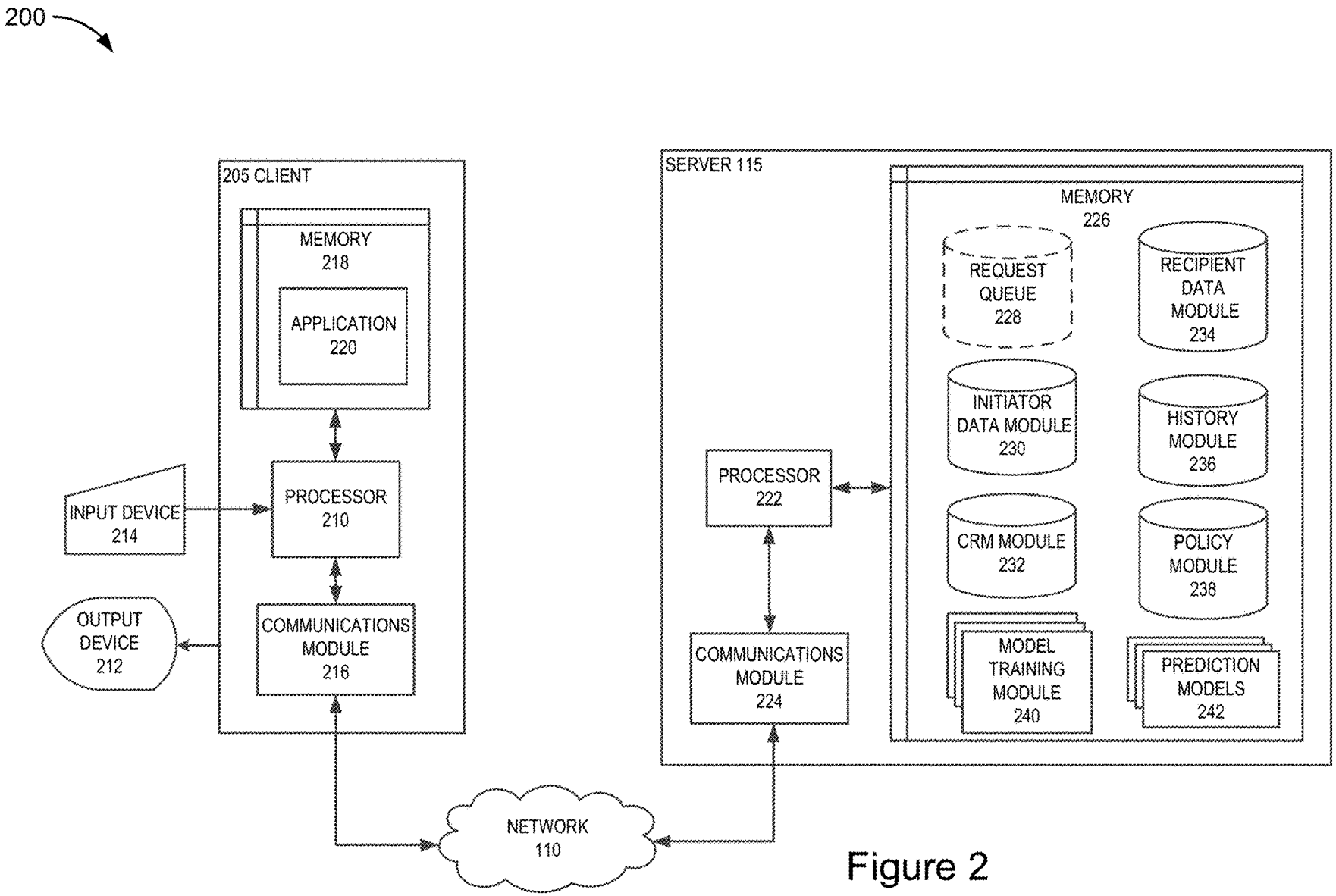
FIG. 2 is a block diagram illustrating an example client-server architecture including the server of FIG. 1, according to certain aspects of the disclosure.

FIG. 2 is a block diagram architecture 200 illustrating an example server 115 similar to the architecture 100 of FIG. 1, according to certain aspects of the disclosure. The architecture 200 also includes a client computing device 205 with which request initiators 105 shown in FIG. 1 may transmit a plurality of communication requests, according to certain aspects of the disclosure. Similarly, the client device 205 may also include computing devices or systems with which request recipients 120 may receive request notifications 130 and/or communication resolutions.

The architecture 200 includes a client 205, as well as the network 110, and the server 115 from the architecture 100 of FIG. 1. The client 205 and the server 115 are connected over the network 110 via respective communications modules 216 and 224. The communications modules 216 and 224 are configured to interface with the network 110 to send and receive information, such as data, requests, responses, and commands to other devices on the network. The communications modules 216 and 224 can be, for example, modems or Ethernet cards.

Client device 205, to which the server 115 is connected over the network 110, can be for example, desktop computers, mobile computers, tablet computers (e.g., including e-book readers), mobile devices (e.g., a smartphone or PDA), wearable computing devices (e.g., a smart watch or a system of sensors that may be worn on the body), or any other devices having appropriate processor, memory, and communications capabilities. The client 205 includes a processor 210, a communications module 216, and a memory 218. The memory 218 includes an application 220. For example, the application 220 may include a web browser, an email application, an instant messaging application, a word processing application, a meeting management or calendaring application, an audio recording application, a video teleconferencing application, a voice-over-internet protocol (VoIP) phone, or a private branch exchange (PBX) phone system. Application 220 may include, but is not limited to, any application used in an organization to generate spoken or non-spoken communication requests. In this way, communication request initiators, such as initiators 105 shown in FIG. 1, may generate communication requests using the client device 205 for transmission over the network 110 to be processed by the server 115. The client 205 also includes an input device 214, such as a keyboard, telephone, camera, microphone, or mouse, and an output device 212, such as a display. The processor 210 of the client 205 is configured to execute instructions, such as instructions physically coded into the processor 210, instructions received from software in memory 218, or a combination of both. For example, the processor 210 of the client 205 executes instructions to transmit communication content generated or received at the client device to server 115 for distributing communication requests based on collaboration circle membership data using machine learning.

The network 110 can include, for example, any one or more of a private branch exchange system (PBX), a public switched telephone network (PSTN), a personal area network (PAN), a local area network (LAN), a campus area network (CAN), a metropolitan area network (MAN), a wide area network (WAN), a broadband network (BBN), the Internet, and the like. Further, the network 110 can include, but is not limited to, any one or more of the following network topologies, including a bus network, a star network, a ring network, a mesh network, a star-bus network, tree or hierarchical network, and the like.

The server 115 can be any device having an appropriate processor, memory, and communications capability for hosting a machine learning process. In certain aspects, one or more of the servers 115 can be located on-premises with client 205, or the server 115 may be located remotely from client 205, for example in a cloud computing facility or remote data center. In certain aspects, one or more of the servers 115 can be a cloud computing server of an infrastructure-as-a-service (IaaS) and be able to support a platform-as-a-service (PaaS) and software-as-a-service (SaaS) services.

The server 115 includes a processor 222, a communications module 224, and a memory 226 that includes one or more machine readable storage mediums containing program instructions for causing a computer to distribute communication requests based on collaboration circle membership data using machine learning. The processor 222 of the server 115 is configured to execute instructions, such as instructions physically coded into the processor 222, instructions received from software in memory 226, or a combination of both. For example, the processor 222 of the server 115 executes instructions to distribute communication requests based on a communication request resolution generated using collaboration circle membership data in a machine learning process configured in the memory 226.

As further shown in FIG. 2, the server 115 also includes a memory 226 configured with one or more data content and/or data processing modules to receive and process communication requests. The data content or data processing modules configured in memory 226 influence how a communication request from a request initiator 105 is delivered to an intended recipient 120 (or a determined request facilitator). The memory 226 includes a request queue 228, an initiator data module 230, and a customer relationship management (CRM) module 232. The memory 226 also includes a recipient data module 234, a history module 236, and a policy module 238. The memory 226 also includes a model training module 240 and a plurality of prediction models 242. The data content or data processing modules shown within memory 226 may be integrated to form one or more aggregated data sources that may be utilized in one or more machine learning processes for the purpose of intelligently distributing communication requests. Additionally, or alternatively, the memory 226 may include fewer, different, or additional data content or data processing modules, not shown in FIG. 2, which may be utilized in the machine learning process to distribute communication requests.

The memory 226 includes a request queue 228 to receive and store the plurality of incoming communication requests generated by client 205. The request queue 226 may provide a virtual holding function to delay the delivery of the communication request to the server 115 until further processing of the communication request is performed utilizing one or more of the data modules also configured in memory 226. For example, a communication request received in the request queue 228 may be evaluated to identify the request initiator 105 and demographic data that is associated with the request initiator 105. In addition, a communication request received in the request queue 228 may be evaluated to determine the request recipient 120 and demographic data related to the request recipient 120. The identity of the request initiator 105, the request recipient 120, and their corresponding, respective, demographic data will be leveraged to predict a resolution to a received communication request using one or more predictive models. In some implementations, the memory 226 may not include the request queue 228, as shown by the dashed lined request queue 228 in the memory 226. In these implementations, the request queue 228 and/or the functionality it performs may be configured within the processor 222. Additionally, or alternatively, the request queue 228 and/or the functionality it performs may also be configured in the server 115.

The memory 226 also includes an initiator data module 230. The initiator data module 230 includes data identifying any request initiator who has previously initiated a communication request into the intelligent communication platform. For example, a first level analysis will determine if the request initiator 105 is known to the intelligent communication platform, followed by determining if the request initiator 105 is known to the intended request recipient 120. If the request initiator 105 is not known to the platform or the intended recipient, the intelligent communication platform will determine if the request initiator 105 is known to the rest of the company. For example, by analyzing aggregated call history data, it can be determined how past communication requests from a particular request initiator 105 (defined by phone number) have been distributed over time.

The initiator data module 230 may also include data identifying a particular request initiator 105 as a member of organization known to the intelligent communication platform even though the particular request recipient 105 is not known to the platform. For example, the platform may determine how best to distribute a communication request received from an unknown request initiator 105 based on how communication requests received from other members of the same organization were distributed.

The initiator data module 230 may include data identifying the request initiator 105 as someone internal or external to an organization in which the intelligent communication platform is configured. In some implementations, the initiator data module 230 may integrate data from other SaaS applications or from public sources that may be used to identify the request initiator 105. For example, the initiator data module 230 may include data from social media applications or social networks, such as LinkedIn™, Facebook™, or Twitter™. The data from social media sources may also include related information such as the number of connections, social status, number of followers, and/or the number of posts made by request initiator 105 in the past. A request initiator 105 with a large number of connections, followers, or posts in social media may be ranked or categorized as an "influencer" such that communication requests from the "influencer" request initiator 105 may be handled differently than a request initiator 105 with a smaller or less influential network. In some implementations, the initiator data module 230 may include an identify graph including a plurality of nodes for known individuals. In some implementations, the initiator data module 230 may include data identifying the request initiator 105 as a registered user of a third party cloud application. A request recipient may have specific preferences set for the platform to process communications requests received from the third party application on behalf of the request initiator 105. The preferences may define the type or format of communication requests to receive as well as how to forward the communication requests. For example, the request recipient may have preferences set to receive only text messages from the third party application on behalf of the request initiator 105 and to forward the text messages to the third party application to be displayed as a communication request received via the platform where the request recipient can respond accordingly in the third party application.

The initiator data module 230 may also include data from or be integrated with a customer support system. A customer support system, also known as a support ticketing platform, includes data related to customer support services that are provided to a particular individual in regard to a product for which they are seeking assistance. For example, the initiator data module 230 may include customer support data such as the number of pending support requests (or tickets) that were opened or generated by the request initiator 105. In addition, the initiator data module 230 may include customer support data such as the resolution rate of past requests (or tickets). The customer support data may also identify which customer support representative has taken calls from the request initiator 105 in the past, which customer support representative has been most successful to resolve the request initiator 105's reported problems, or which customer support representative does adequately resolve the problems reported by the request initiator 105.

The initiator data module 230 may also include data from or be integrated with a caller identification name (CNAM) or public caller identification system. For example, the initiator data module 230 may also include data stored in publicly available phone directories (e.g., "yellow pages").

The memory 226 also includes a customer relationship management (CRM) module 232. The CRM module 232 may include data from or be integrated with a CRM tool. CRM tools allow a company or organization to manage their interaction with current and potential customers by using data analysis about the customers' history to guide business relationships with customers. For example, the CRM module 232 may include data about the size of the company for which a request initiator 105 is employed, data about how may sales opportunities or deals are pending, and/or data about past interactions, for example who within the company has taken calls from the request initiator 105 in the past.

The memory 226 also includes a recipient data module 234. The recipient data module 234 may include data identifying the request recipient 120 to whom a request initiator 105 is requesting to communicate with. Data included within the recipient data module 234 may also be used to determine if the request initiator 105 is an internal member of the organization in which the intelligent communication platform is configured in order to identify the request initiator 105 (e.g., the request initiator 105 is a member of the same organization as the request recipient 120). The data included in the recipient data module 234 may include formal and informally structured data. Formally structured data may include data defined by a company's organizational structure and be relatively static. For example, formally structured data may include active directory databases or listings, as well as data from human resources software, such as Workday™. The formally structured data may also include data that is manually entered into an employee management user-interface that is part of the intelligent communication platform or data that is automatically pulled from other identity software tools used in the company.

The recipient data module 234 may also include informally structured data, such as data defined by voluntary memberships to collaboration circles. The informally structured data can be more dynamic in nature. Collaboration circles may be defined based on either formal or informal relationships. For example, a collaboration circle may be formally defined to include a business unit executive and the resources reporting to the executive. Additionally, or alternatively, a collaboration circle may be informally defined to include members of a project team comprised of members from different business units within the organization. Collaboration circles may be created to enable efficient communication among members of the circle. For example, communication methods such as instant messaging, voice and/or video calling, virtual or video collaboration sessions, note sharing, and meeting scheduling may be conducted in a more efficient manner because of the preferences that are shared between members of the collaboration circle specifying how each member wishes to receive communication requests.

The memory 226 also includes a history module 236. The history module 236 includes historical data associated with how a request initiator 105 has interacted with the intelligent communication platform in the past and provides a second level of analysis to the analysis performed in regard to the initiator data module 230 described above. The history module 236 includes historical data describing the past methods that were employed to distribute communication requests from the request initiator 105 to a specific request recipient 120, to a previously determined request facilitator, and/or to other recipients throughout the company or organization. The history module 236 enables historical data about how past communication requests were distributed to be leveraged in live decision making for newly received communication requests. The history module 236 data is utilized in the second level of analysis to evaluate historical patterns for different communication modes and/or channels that may have been used in the past in regard to a particular request initiator 105. The history module 236 data will be weighted based on frequency and recency and used in new or live determinations of how to distribute a communication request from a particular request initiator 105 in the machine learning process. The history module data 236 may include call history data, such as the participants in the communication request and resolution, the timestamps for any call received from a request initiator 105, as well as what actions were taken in regard to a particular initiator 105 (e.g., calls initiated, answered, sent to voice mail, declined, and forwarded). In addition, the history module 236 data may also include chat, instant message, or text message history data such as the participants, the volume of messages, and time stamps of the messages. The history module data 236 may also include meeting history data such as the meeting participants, the volume of meetings that have occurred in the past, time stamps for the meetings occurring in the past, and meeting notes. The history module data 236 may further include data regarding voice notes, such as voice mail or any other form of audio notes associated with the particular request initiator 105. The voice note data may include the participants, the volume of voice notes that have occurred in the past, as well as the time stamps for each past voice note.

The data stored in the history module 236 may be utilized in conjunction with live data to predict how to resolve and distribute the communication request received from a particular request initiator 105. For example, the live data may include presence or availability status data associated with an intended recipient 135. The live data may also include a preferred communication mode for the intended recipient 135, as well as the specific time in which a communication request is received.

An additional data source, not shown in FIG. 2, which may also be configured in the memory 226 of server 115, is the customer health data module. The customer health data module would include data measuring the health or viability of the customer. For example, the customer health data module may include new product sales scores. The machine learning process used in the intelligent communication platform may be trained to distribute communication requests based on positive or negative new product sales data. In addition, the customer health data module may include data associated with the likelihood of product renewal or the recency of renewal. The customer health data module may also include data corresponding to the tone or perceived satisfaction of the request initiator 105 in a past phone call. The tone or perceived satisfaction data may be manually entered from call notes, managerial feedback, or call summary codes. In addition, the tone or perceived satisfaction data may also be automatically derived from voice data analysis tools that evaluate the voice recording of a call and grade the caller's (e.g., the request initiator 105's) tone or perceived satisfaction based on the language used by the caller, the tone of the caller's voice, and the level of interaction between the caller and the recipient. In this way, calls can be flagged as "healthy" or "un-healthy" in order to be flagged for follow-up escalation or training purposes. For example, if a particular request initiator 105 has a history of poor or un-healthy calls with a particular organization, for example a company's customer support team, the intelligent communication platform may be trained to distribute a future incoming communication request from the particular request initiator 105 in a rapid manner to recipients with the best customer engagement skills or ratings.

As further shown in FIG. 2, the memory 226 may also include a policy module 238. The policy module 238 may include one or more policies associated with how communication requests may be distributed within an organization. The policy module 238 may include policies, implemented as conditional if-then rules that are associated with a request initiator 105, an intended recipient 135, or a designated recipient 140. Additionally, the policy module 238 may include policies for generating communication request resolutions and distributing communication requests. For example, the policy module 238 may include policies for distributing communication requests based on whether or not a request initiator 105 is internal or external to an organization, whether or not a communication request is received from a known phone number, whether a communication request is directed to a specific individual recipient or a business unit, and/or whether or not the individual or the business unit is busy or otherwise unavailable. Additionally, or alternatively, the policy module 238 may include policies such as the date or time of day a communication request was received, whether the call is directly placed to a request recipient or whether the call is from a queue associated with a department's main number. In some implementations, the policy module 238 may also include policies defined based on whether or not the communication request is associated with a phone number that has called identification (e.g., caller ID) or if the caller ID is blocked or otherwise unavailable. In some implementations, the policy module 238 may also include policies defined based on whether the call is coming from another user of the intelligent communication platform or from a guest user of the platform. For example, a guest user may include a user who is outside of the organization employing the intelligent communication platform, yet is a user with whom the request recipient interacts or collaborates with frequently. In this example, a user may become a guest user of the platform and a member of a particular collaboration circle in order to share collaboration experiences with other platform users. The platform may then allow the guest user to, for example, share instant messages, start or participate video collaboration sessions, or share screens with other users in the platform. The platform and the policies associated with a guest user may be configured to prioritize guest user communication experiences higher than other users in the platform.

The policies included in the policy module 238 may prescribe distribution methods for the communication request so that the communication request resolution generated as a result of the machine learning process is directed to an appropriate request facilitator 140 in the event an intended request recipient 135 is unavailable. The policies may determine the appropriate request facilitator 140 and determine the appropriate request notification 130 based on collaboration circle membership data defined in one or more collaboration circle profiles associated with the intended request recipient 135.

As shown in FIG. 2, the memory 226 also includes a model training module 240. The model training module 240 functions in a machine learning process to receive data as training input and processes the data to train one or more training models. The model training system 240 may include a feature selector, a model trainer, and one or more training models. In some implementations, the training models that are generated and output as a result of the machine learning process are configured on server 115 as standalone components on server 115. For example, the trained prediction models 242 are configured on server 115 to process data and output a communication request resolution for a received communication request from a request initiator 105. In some implementations, the trained prediction models 242 are stored in memory 226 on server 115.

The model training module 240 is configured to implement a machine learning process which will receive data as training input and generate a training model that can be subsequently used to predict and generate a communication request resolution. The components of the machine learning process operate to receive data as training input, select unique subsets of features within the data, use a machine learning algorithm to train a model based on the subset of features in the training input, and generate a training model that may be output and used for future predictions based on a variety of received data.

The feature selector included in the model training module 240 operates in the machine learning process to receive data and select a subset of features from the data which will be provided as training inputs to a machine learning algorithm. In some implementations, the feature selector may select a subset of features as data from one or more of the modules 230, 232, 234, 236, and/or 238, such that the machine learning algorithm will be trained to predict and generate a communication request resolution based on the selected subset of features. For example, the feature selector may select data associated with an individual user type (e.g., a request initiator or a request recipient) as features to be provided as training inputs to the machine learning algorithm. Additionally, or alternatively, the feature selector may select data associated with a specific property of an individual user, such as the user's availability status or membership in one or more collaboration circles. For example, a user property may be defined in a tag that is associated with any user to identify and associate the user with a particular group corresponding to the tag. A tag may be used to identify members of a team, such as a product management team, for which a collaboration circle may be formed.

During the machine learning process, the feature selector provides the selected subset of features to a model trainer as inputs to a machine learning algorithm to generate one or more training models. A wide variety of machine learning algorithms may be selected for use, including algorithms such as support vector regression, ordinary least squares regression (OLSR), linear regression, logistic regression, stepwise regression, multivariate adaptive regression splines (MARS), locally estimated scatterplot smoothing (LOESS), ordinal regression, Poisson regression, fast forest quantile regression, Bayesian linear regression, neural network regression, decision forest regression, boosted decision tree regression, artificial neural networks (ANN), Bayesian statistics, case-based reasoning, Gaussian process regression, inductive logic programming, learning automata, learning vector quantization, informal fuzzy networks, conditional random fields, genetic algorithms (GA), Information Theory, support vector machine (SVM), Averaged One-Dependence Estimators (AODE), Group method of data handling (GMDH), instance-based learning, lazy learning, and Maximum Information Spanning Trees (MIST).

The model trainer evaluates the machine learning algorithm's prediction performance based on patterns in the received subset of features processed as training inputs and generates one or more new prediction models 242. The prediction models, e.g., trained communication request resolution prediction models 242, are then capable of receiving communication request data from a request initiator 105 outside of the machine learning process in which they were trained and generated to output a communication request resolution to an appropriate request facilitator 140 for a given received communication request.

As shown in FIG. 2, the memory 226 includes a plurality of prediction models 242. Each model, of the plurality of prediction models 242, generated as a result of performing the machine learning process, may receive communication request data and process the communication request data to generate and output a predicted communication request resolution to the processor 222. For example, the trained prediction models 242 that were produced in the machine learning process may subsequently be included in an artificial intelligence system or application configured to receive communication request data as prediction inputs, and process the data to output communication request resolutions, including request notifications 130. In some implementations, the processor 222 may store the predicted communication request resolutions output from the trained prediction model 242 in memory 226. In other implementations, the outputted communication request resolutions may be forwarded to communications module 224 for transmission to the client 205 via network 110. Once received by the client 205, the outputted communication resolutions and request notifications 130 may be transmitted to output device 212, such as a monitor, printer, portable hard drive, or other storage device.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

FIG. 3 is a diagram that illustrates a plurality of collaboration circle profiles for use in distributing communication requests using machine learning, according to certain aspects of the disclosure. The collaboration profiles 305-320 shown in FIG. 3 are associated with the request recipients 120A-D, respectively. The collaboration circle profile 325 is associated with collaboration circle 125B and illustrates a collaboration circle profile for a business unit or team such as a customer support team.

As shown in FIG. 3, collaboration circle profile 305 includes a plurality of data associated with request recipient 120A of FIG. 1. For example, viewed from top to bottom, the collaboration circle profile 305 includes information describing the location of request recipient 120 such as office building, office floor, and office or desk number. The collaboration circle profile 305 further includes information describing the organization(s) within the company that request recipient 120A is a member of. For example, request recipient 120A is a member of the Product Management team and the Sales team. The collaboration circle profile 305 further includes information describing position and level of request recipient 120A. The collaboration circle profile 305 further includes information describing whether or not request recipient 120A has an administrative role or setting. The collaboration circle profile 305 further includes information describing request recipient 120A's presence or availability status to be applied to communication requests received from external contacts. For example, as configured in collaboration circle profile 305, request recipient 120A's external availability status will be applied as public in the platform for all communication requests where request recipient 120A is the intended recipient. Thus, if a communication request from an external contact intended for request recipient 120 is received, the presence or availability status of request recipient 120A will be made public in the platform. In some implementations, a user's individual availability status may be set to public, however based on a policy applied by the platform for a particular communication request associated with the user, the users availability would not be made public to others within the organization.

The collaboration circle profile 305 further includes information describing request recipient 120A's membership in one or more business units or project teams for which one or more collaboration circles may be created. For example, request recipient 120A is a member of the Product Management (PM) team and a collaboration circle 125A has been created for members of that team. Similarly, request recipient 120A is also a member of the Sales team and a collaboration circle 125C has been established for that team. As further shown in collaboration circle profile 305, the collaboration circle membership data also describes request recipient 120A's individual contact information, such as the number associated with their office phone line and the number associated with a cellular or mobile phone. The collaboration circle membership data also identifies the recipient's presence or availability status settings for communication requests received from internal and external contacts, as well as the times of day that the presence or availability status settings should be applied. For example, as shown in collaboration circle profile 305, as Senior Product Manager and a member of the Product Management collaboration circle 125A, request recipient 120A has set their presence or availability status to be public for communication requests received between the hours of 9 am and 5 pm from internal contacts. For communication requests received from external contacts between the hours of 5 pm and 9 am, request recipient 120A's presence or availability status will be private. As further shown in collaboration circle 305, request recipient 120A is also a member of the Sales team and included in the collaboration circle 125C with recipients 120B and 120C, who are also members of the Sales team and thus included in the Sales team collaboration circle 125C. For any communication requests intended to the Sales team, request recipient 120A's presence or availability status setting will be made public to all 24 hours a day, 7 days a week (e.g., 24/7), so that request recipient 120A can receive Sales communication requests any time. In some implementations, the availability status settings associated with various times of day can be leveraged in the platform to determine how best to distribute or resolve a communication request. For example, the platform may determine a particular distribution method for a user between 9 am and 5 pm so that received communication requests reach the user in the most efficient manner possible during the business day. While, during the hours of 5 pm and 9 am, the platform may determine, based on the user's availability status settings, that communication requests should be placed on hold or otherwise distributed in a non-intrusive format such as an email or instant message instead of a phone call.

The collaboration circle profile data may also include information identifying and describing other request recipients 120 who are in the same business unit (not shown) and who are similarly associated with the same collaboration circle corresponding to the business unit. In some implementations, the availability status of a request recipient is determined based on collaboration circle profile data for a collaboration circle in which the request initiator or the request facilitator and the request recipient are both members. In some implementations, the availability status of the request recipient is determined based on collaboration circle profile data associated with a collaboration circle which includes the request recipient as the only member. In some implementations, the availability status of a request recipient is determined based on one or more predictive models derived from the machine learning process.

As further shown in FIG. 3, collaboration circle profile 310 includes a plurality of data associated with request recipient 120B of FIG. 1. Request recipient 120B is a member of the same collaboration circles 125A and 125C as request recipient 120A. The collaboration circle profile 310 associated with request recipient 120B includes collaboration circle membership data and settings that are similar, but not identical, to the data and settings of request recipient 120A as described above. Similarly, collaboration circle profiles 315 and 320 are associated with request recipients 120C and 120D, respectively, and also include collaboration circle membership data and settings that are similar, but not identical to the data and settings of the other request recipients 120.

As further shown in FIG. 3, collaboration circle profile 325 includes a plurality of data associated with collaboration circle 125B of FIG. 1. The collaboration circle profile 325 is associated with the "Support team" and includes data and settings pertaining to communication requests intended for the Support team. As seen in collaboration circle profile 325, the Support team availability status is configured as public to all. The administrator within the Support team is identified as request recipient 120D. The members of the Support team are also identified along with additional information describing the Support team member position and level. In this way, the intelligent communication platform may identify members of the collaboration circle who share control of incoming communication requests.

The collaboration circle profile data and settings for an individual recipient may be auto-generated by the intelligent communication platform based on settings associated with the collaboration circle corresponding to a particular business unit. For example, when new members join a business unit, the collaboration circle profile data may be refreshed to update the information identifying the new members of the business unit as added collaboration circle members. In some implementations, the availability status setting may include an "apply all" function allowing an individual request recipient to apply a certain presence or availability setting to communication requests received from all (e.g., internal and external) request initiators 105. In some implementations, individual collaboration circle profile settings may override auto-generated collaboration circle profile settings for a business unit, such as those described in relation to collaboration circle profile 325.

Figure 4:
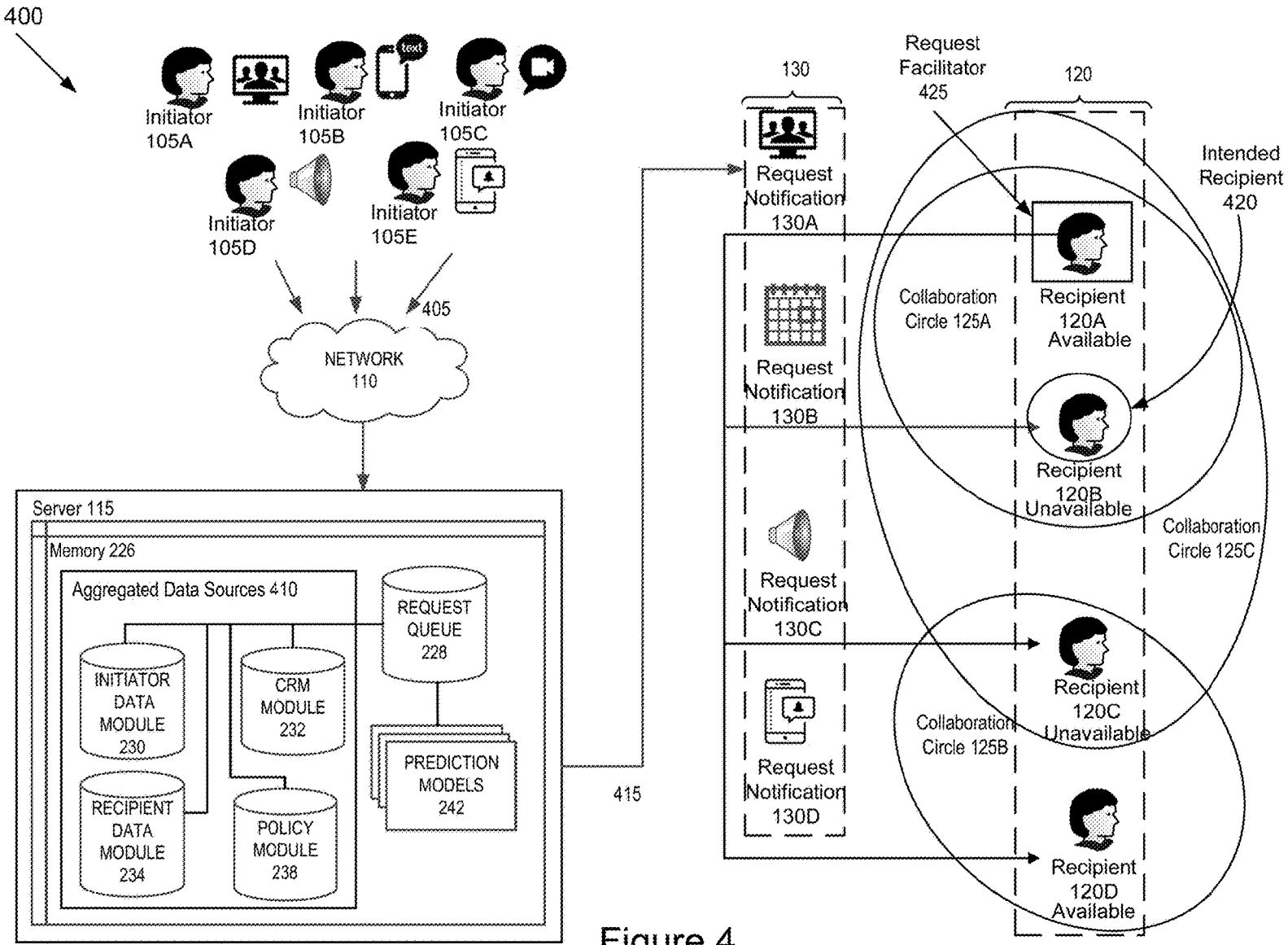
FIG. 4 is a block diagram illustrating distributing communication requests based on collaboration circle membership data using machine learning, according to certain aspects of the disclosure.

FIG. 4 is a diagram 400, illustrating a distribution of communication requests based on collaboration circle membership data using machine learning, according to certain aspects of the disclosure.

As shown in FIG. 4, a variety of communication requests may be generated by a plurality of request initiators 105A-E. For example, as shown in diagram 400, a communication request may include a video collaboration session generated by request initiator 105A, a text message generated by request initiator 105B, a video call generated by request initiator 105C, an audio note generated by request initiator 105D, and a push notification generated by request initiator 105E. Each request initiator 105 may generate a communication request from a client device or client computing system, such as the client computing device 205 shown and described in relation to FIG. 2. The communication requests are intended for one or more request recipients 120 shown in a dashed line box surrounding request recipients 120A-D. The generated communication requests 405 are transmitted to network 110 and received by the server 115. The server 115 is configured with memory 226, which includes aggregated data sources 410, a request queue 228, and a plurality of prediction models 242. The aggregated data sources 410 include multiple data content or data processing modules to receive and process communications requests 405. The data content and/or data processing modules shown as aggregated data sources 410 correspond to those described in relation to FIG. 2. The memory 226 also includes a request queue 228 and one or more prediction models 242. Similarly, the request queue 228 and the prediction models 242 correspond to those described in relation to FIG. 2.

The communication requests 405 are received by the server 115 and stored in the request queue 228. The request queue 228 may act as a virtual queue or apply a virtual holding function to the received communication requests 405. In some implementations, the request queue 228 is a dedicated server or other non-virtual computing device configured to receive and store communication requests 405. The request queue 228 may be configured to perform analysis and processing of the received communication requests 405 in order to generate a communication resolution for each received communication request based on one or more data content and/or data processing modules included in the aggregated data sources 410. For example, upon receiving a communication request 405, the request queue 228 may perform processing on the communication request to identify the request initiator 105 and the recipient 120. Additional processing performed on the communication requests 405 received in the request queue 228 may also include identifying the request initiator 105 using data configured in the CRM module 232. The aggregated data sources 410 may also include live or historical communication pattern data associated with a customer relationship management tool data source, a social network data source, a support ticketing platform data source, a customer support data source, a call history data source, a chat history data source, a calendar data source, a voicemail data source, or a caller ID name database. In some implementations, the received communication requests 405 may be processed utilizing data included in the policy module 238 to determine any specific rules or policies that should be applied to the communication request based on the identity of the request initiator 105 and/or the request recipient 120.

The received communication requests 405 are further processed utilizing one or a plurality of prediction models 242. Each prediction model of the plurality of prediction models 242 is configured to receive a communication request 405 from a request initiator 105 and generate a communication request resolution 415 including a request facilitator from among the request recipients 120 and a request notification 130. The prediction models 242 generate the communication request resolution 415 based on the collaboration circle profile data identifying the availability status of the intended request recipient 120 and request facilitators within the same collaboration circle 125 as the intended request recipient 120 who are available to receive the communication request 405 when the intended request recipient 120 is unavailable to receive the communication request 405. The prediction models 242 have been trained in a machine learning process to generate a communication resolution 415 including a request facilitator and request notification 130. The server 115 distributes the communication request resolution to the predicted request facilitator using the request notification 130 predicated by the one or more prediction models 242.

For example, referring further to FIG. 4, assume that a communication request 405 is received from request initiator 105C. The communication request 405 from request initiator 105C is a video call (e.g., as shown by a video camera icon). Initiator 105C is directing the video call communication request to request recipient 120B. For example, initiator 105C is a vendor attempting to contact a Sales team account representative, request recipient 120B (e.g., intended recipient 420), to discuss participating in an upcoming tradeshow. Request recipient 120B, the intended recipient 420, is a member of the Sales team and included in the collaboration circle 125C that has been created to manage communications associated with the Sales team. Fellow sales team members, request recipients 120A and 120C, are also members of the Sales team and are also members of the collaboration circle 125C. Based on historical communication patterns and/or notification preferences of the request recipients 120, the plurality of predictive models 242 may determine one or more request notifications 130 that should be distributed to request recipients 120 when video call communication requests are received from request initiator 105C. For example, a variety of request notifications 130 may be distributed to request recipients 120 based on historical communication patterns between request recipients 120 and request initiator 105C or based on request recipients 120 notification preferences. Request recipient 120A has historically chosen to receive a video collaboration session notification request 130A in response to a video call communication request from request initiator 105C. In some implementations, request recipient 120A may have a notification preference configured within their collaboration circle profile to define the request notification 130 that should be provided in response to a communication request received from request initiator 105C or directed to the Sales team. For example, request recipient 120B has a notification preference to receive a meeting invitation request notification 130B in response to a video call communication request from request initiator 105C. Request recipient 120C has historically sent video call communication requests from initiator 105C to voicemail and has a notification preference setting configured to provide an audio note of the voicemail as the request notification 130C. In some implementations, the request notifications 130 may be defined in collaboration circle profile data associated with the individual request recipient 120 or the Sales team business unit.

The plurality of predictive models 242 may further determine a request facilitator 425 associated with the communication request resolution based on the availability status or presence of request recipients 120 who are also members of the collaboration circle 125. In some implementations, the predictive models 242 may determine a request facilitator 425 based on the availability status of request recipient 120 as a member of their own collaboration circle 125. The availability status or presence for request recipients 120 may be defined in collaboration circle profile data described in relation to FIG. 3. For example, upon receiving a video call communication request from request initiator 105C, the server 115 may leverage availability status or presence data included in the aggregated data sources 410 and provide the availability status information as inputs to the prediction models 242 in order to determine the appropriate recipient 120 for the communication request received from request initiator 105C. As shown in FIG. 4, the solid-line circle surrounding request recipient 120B indicates that request recipient 120B is the intended request recipient 420 for the video call received from request initiator 105C. However, request recipient 120B is unavailable to receive the video call. Request recipient 120C is also a member of the Sales team and collaboration circle 125C, and is also unavailable to take the video call from request initiator 105C. Request recipient 120A, who is also a member of collaboration circle 125C, is available to receive the video call from request initiator 105C. The predictive models 242 generate a communication request resolution identifying request recipient 120A (as indicated by the solid line square surrounding request recipient 120A) as the request facilitator 425 to receive the video call from request initiator 105C that was originally directed to request recipient 120B as the intended request recipient 420. The server 115 generates a video collaboration session notification message 130A that is forwarded to request recipient 120A to implement the communication request resolution 415 that was predicted by one or more of the prediction models 242.

Figure 5:
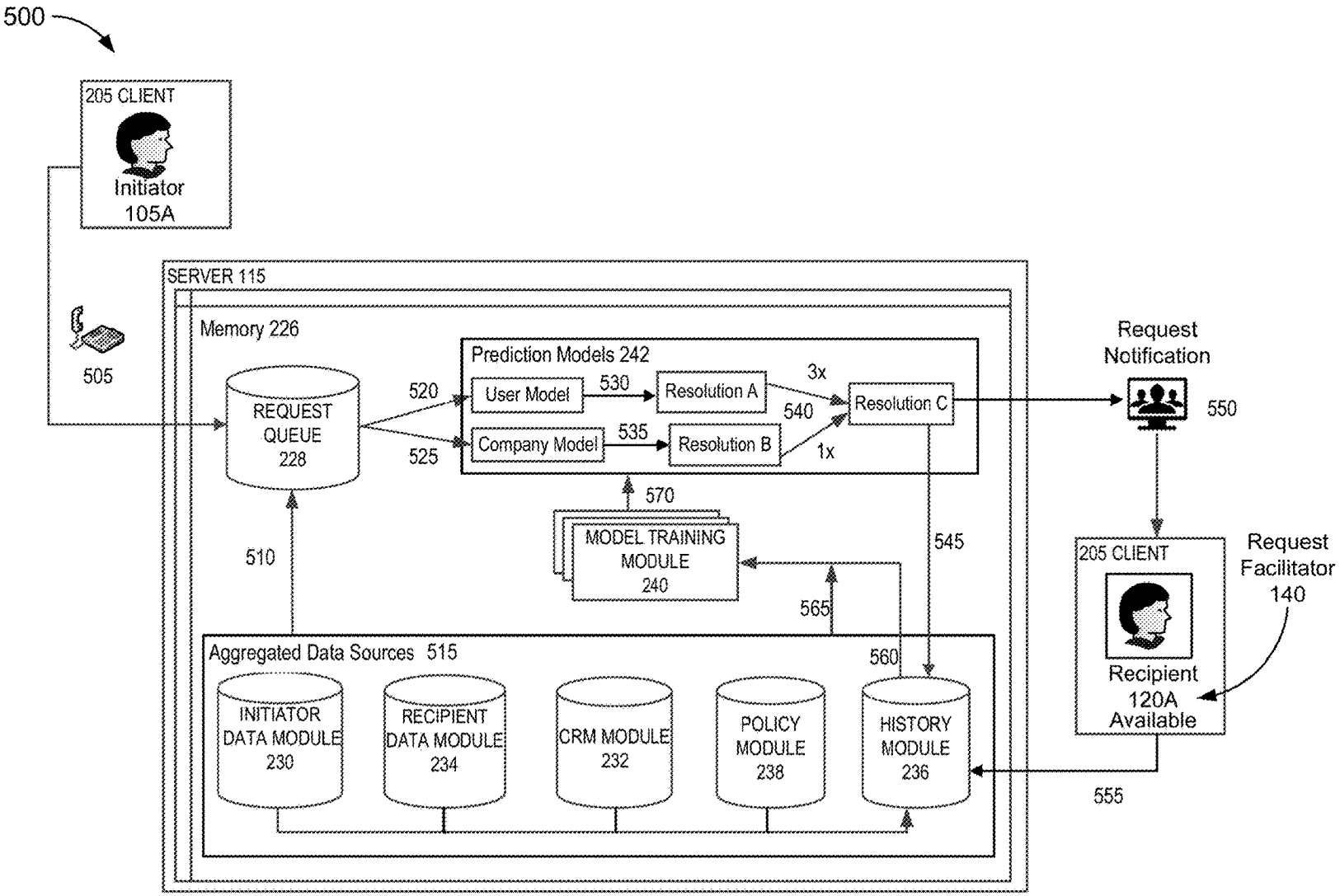
FIG. 5 is a block diagram illustrating an example machine learning architecture for generating communication request resolutions, according to certain aspects of the disclosure.

FIG. 5 is a block diagram illustrating an example machine learning architecture 500 for generating communication request resolutions, according to certain aspects of the disclosure. The client 205 and server 115 shown in FIG. 5 correspond the client 205 and server 115 described in relation to FIG. 2. In addition, the data content and/or data processing modules shown in FIG. 5 that are configured within memory 226 of server 115 also correspond to the data content and/or data processing modules shown and described in relation to FIG. 2.

As shown in FIG. 5, client 205 may generate a telephone call as a communication request 505 from request initiator 105A. The communication request 505 is received by the server 115 and stored in the request queue 228. The request queue 228 may receive data inputs 510 from aggregated data sources 515 and perform processing to determine the identity of the request initiator 105, the identity of the request recipient 120, and/or what policies or rules may be applied to the received communication request 505 in order to predictively determine a communication request resolution. Updated communication requests are then analyzed in one or more contexts by the plurality of prediction models 242, wherein each model leads to its own context-specific prediction of a communication request resolution. For example, updated communication requests 520 are analyzed using a user-specific prediction model (e.g., labeled "User Model") to evaluate how the intended recipient 120 behaved or communicated in the past in regards to phone calls and/or to communication requests of any kind from request initiator 105A. The communication request resolution that is generated as a result of the user-specific analysis is output 530 as "Resolution A." Similarly, updated communication requests 525 are analyzed using a company-specific model (e.g., labeled "Company Model") to evaluate how others in the company or organization have behaved or communicated in the past in regard to phone calls and/or to communication requests of any kind from request initiator 105A. The communication request resolution that is generated as a result of the company-specific analysis is output 535 as "Resolution B." Analyzing each received communication request using a plurality of models may help reduce bias in the generated communication request resolutions. The two outputs, Resolution A and Resolution B, may then be collectively analyzed 540 and weighted values may be applied to determine a final predicted communication request resolution, e.g., Resolution C. For example, as shown in FIG. 5, Resolution A, the communication request resolution associated with user-specific models, will receive three times (e.g., 3×) greater priority in determining the final resolution, e.g., Resolution C, than Resolution B (e.g., 1×) that is associated with company-specific models. In some implementations, recency and frequency of interaction with a communication request initiator will be important weighting factors that are applied in the predictive models 242. In some implementations, the values of the weighting factors applied to predicted outcomes of one or more of the prediction models 242 may vary and be user-defined based on the priority given to one predictive model over another in the determination of a final communication request resolution. In some implementations, the final resolution, e.g., Resolution C, may be forwarded 545 to the history module 236 for use in the model training aspect of the machine learning process.

As further shown in FIG. 5, Resolution C has been determined by one or more predictive models 242 and the appropriate request notification 550 (e.g., a video collaboration request) is output to client 205 for request recipient 120A who has been determined as the request facilitator 140. Based on the action taken by request recipient 120A, data 555 is provided back to the history module 236.

The history module 236 continuously provides historical data 560 as input to the model training module 240 for use in training one or more prediction models 242 to generate a communication request resolution. The historical data 560 can be analyzed in scheduled batches or as a continuous stream of updated data that is provided to the model training module 240. In addition, the aggregated data sources 515 may provide annotations to the historical data 560 for use in training one or more prediction models 242. In some implementations, the prediction models 242 are derived from a machine learning process based on the aggregated data sources 515. The newly trained models may then be deployed 570 into the plurality of prediction models 242 that are used to process newly received communication requests 505.

Figure 6:
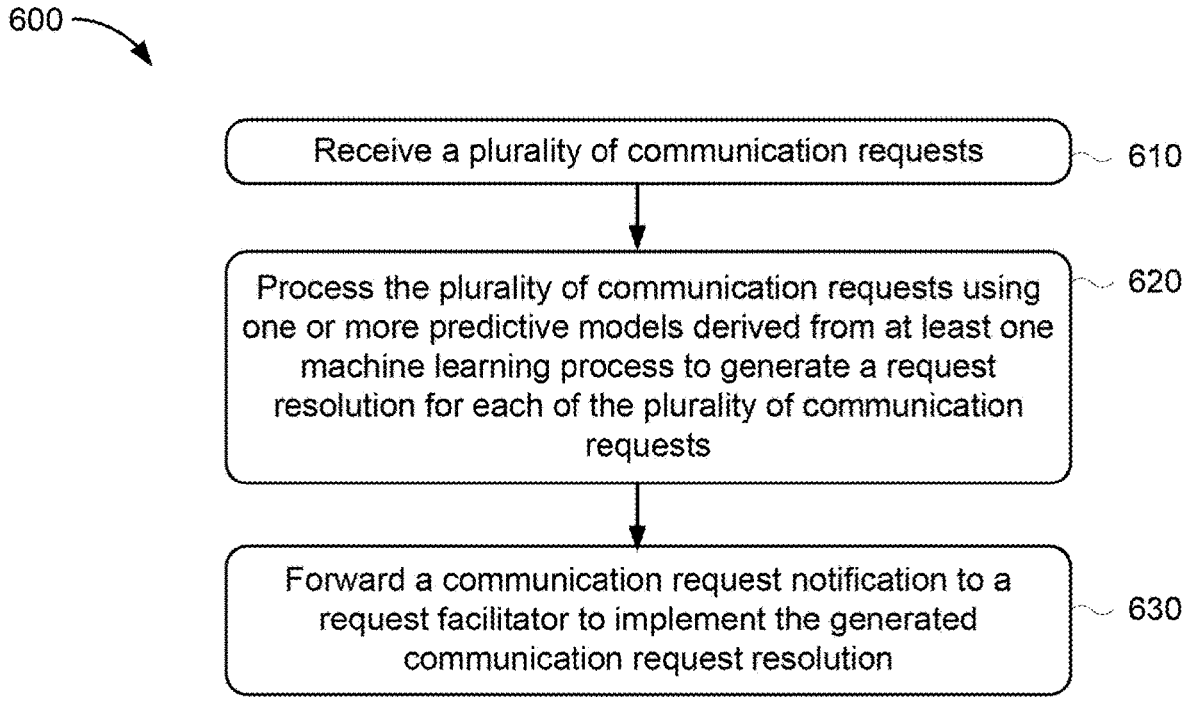
FIG. 6 illustrates an example process for distributing communication requests based on collaboration circle membership data using machine learning described in relation to the example server of FIG. 3.

FIG. 6 illustrates an example process for distributing communication requests based on collaboration circle membership data using machine learning described in relation to the example server of FIG. 2.

FIG. 6 illustrates an example process 600 for distributing communication requests based on collaboration circle membership data using machine learning using the example client 205 and server 115 of FIG. 2. While FIG. 6 is described with reference to FIG. 2, it should be noted that the process steps of FIG. 6 may be performed by other systems.

The process 600 begins by proceeding from step 610 where server 115 receives a plurality of communication requests. The plurality of received communication requests can be generated by application 220 of client 205 or otherwise provided via network 110. Each communication request, of the plurality of communication requests, may be received by the intelligent communication platform in a single instance of time and are time-stamped by the platform based on the date and time the communication request was received. In some implementations, the plurality of communication requests may be received at the same time or as batches of communication requests that are received at varying times. Each communication request of the plurality of communication requests includes a request initiator and a request recipient. The plurality of communication requests can include, but is not limited to, telephone calls, email messages, text messages, video calls, audio notes, video collaboration sessions, meeting invitations, or push notifications. The plurality of communication requests can include spoken and non-spoken content that is generated and received by request initiators who are members of an organization (e.g., internal members) or are non-members of the organization (e.g., external members). The plurality of communication requests are received and stored in the request queue 228 in preparation for processing by one or more prediction models 242.

Next, in step 620, the server 115 processes the plurality of communication requests using one or more predictive models derived from at least one machine learning process to generate a request resolution for each of the plurality of communication requests. For example, the server 115 may include a plurality of prediction models 242 capable of receiving communication requests as input and generating a communication request resolution for each communication request. The generated communication request resolution may identify a request facilitator and include a request notification based on collaboration circle profile data associated with the predicted request facilitator. The prediction models 242 may be derived from a machine learning process and include one or more prediction models associated with the communication patterns of a request recipient. In some implementations, the prediction models 242 may include one or more prediction models associated with the communication patterns of all members of an organization in which the intelligent communication platform is implemented. In some implementations, the prediction models 242 may include one or more prediction models 242 associated with the communication patterns of all request recipients within a collaboration circle.

The process ends in step 630 where a communication request notification is forwarded to a request facilitator to implement the generated communication request resolution. The communication request resolution generated by the prediction models 242 identifies a request facilitator and includes a request notification that is forwarded to the request facilitator. Upon taking action in regard to or in response to the notification message, the request facilitator implements the communication request resolution and conducts a communication experience with the request initiator on behalf of an intended request recipient who was otherwise unavailable. The communication request resolution is generated based on collaboration circle profile data associated with the request recipient, the request facilitator, and/or a business unit collaboration circle that the request recipient, the request facilitator, and/or the request initiator are members of.

Figure 7:
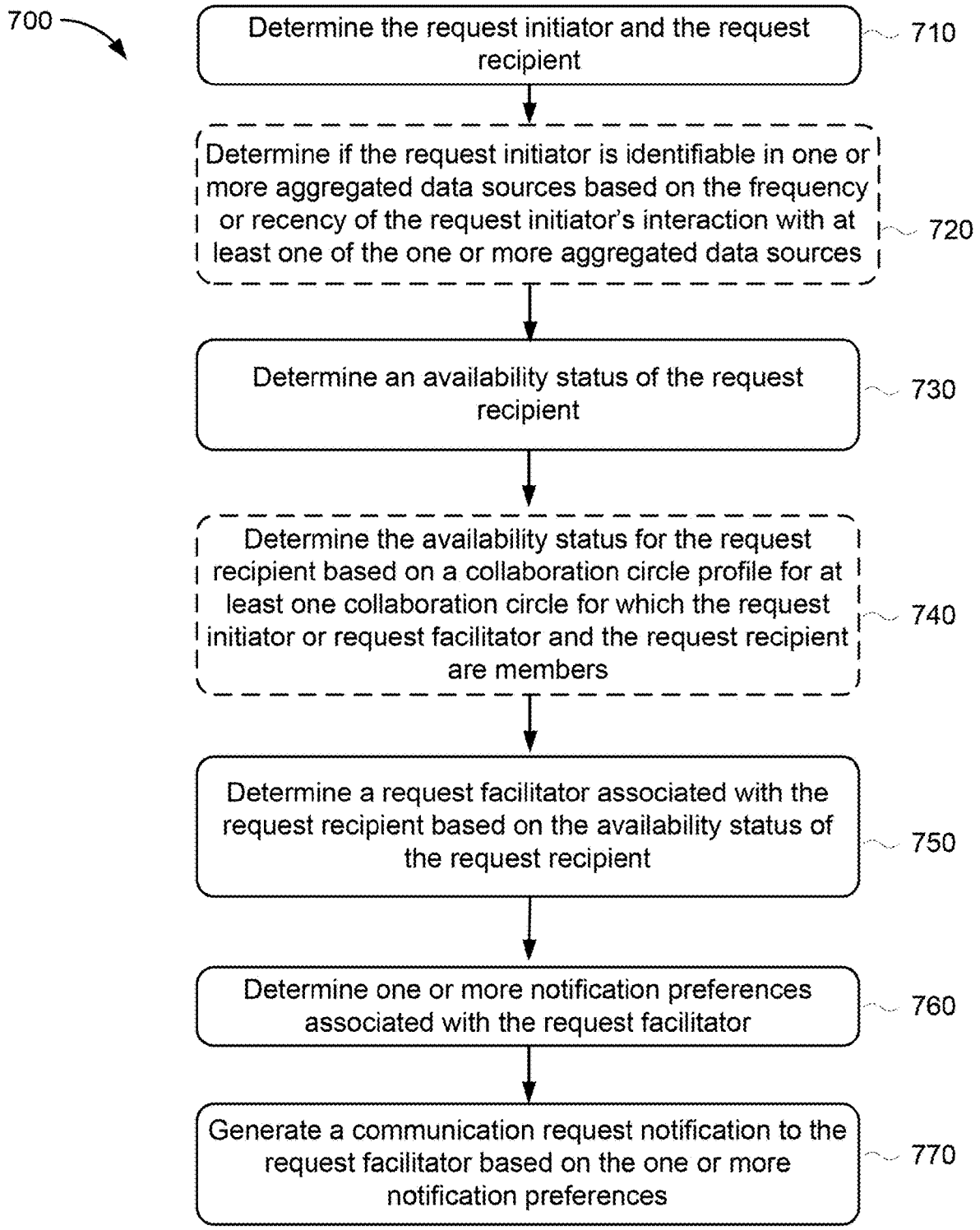
FIG. 7 illustrates an example process for generating a communication request resolution using machine learning described in relation to the example server of FIG. 3.

FIG. 7 illustrates an example process 700 for generating a communication request resolution using machine learning using the example client 205 and server 115 of FIG. 2. While FIG. 7 is described with reference to FIGS. 2, 3, and 4, it should be noted that the process steps of FIG. 7 may be performed by one or more modules or processing components of server 115.

The process 700 begins by proceeding from step 710 where server 115 determines a request initiator and a request recipient in a communication request received from client 205. The server 115 may store received communication requests in memory 226, for example in the request queue 228, and perform further processing to identify who sent or initiated the communication request (e.g., initiator 105) and who is to receive or be the recipient of the communication request (e.g., recipient 120). Based on determining the identity of the request initiator and the request recipient, the server 115 processes the communication request to determine how to distribute the communication request using one or more predictive models 242, so that a communication request resolution may be generated to facilitate or otherwise complete the communication interaction between the request initiator and a request facilitator in the event the intended request recipient 420 is unavailable.

Next, in step 720, if the server 115 is unable to determine the request initiator 105 from step 710, the server may optionally (as shown by the dashed lines of step 720) process each of the plurality of communication requests to determine if the request initiator 105 is identifiable in the aggregated data sources 410 shown in relation to FIG. 4. The server 115 may determine the request initiator 105 using the aggregated data sources 410 based on the recency or frequency of the request initiator 105's interactions with at least one of the data sources included in the aggregated data sources 410. For example, server 115 may determine if request initiator 105 is identifiable in a CRM module 232 by evaluating CRM the last time or last five times in the past month that request initiator 105 forwarded communication requests to an account manager within the organization. The one or more aggregated data sources may include live or historical communication pattern data associated with a CRM tool data source, a social network data source, a support ticketing platform data source, a customer support data source, a call history data source, a chat history data source, a calendar data source, a voicemail data source, or a caller ID name database.

As further shown in FIG. 7, in step 730 the server 115 determines an availability status of the request recipient. Upon determining the request recipient 120, the server 115 may determine an availability status associated with the identified request recipient 120, e.g., the availability status of the intended request recipient 420. The availability status of the intended request recipient 120 may be included in one or more collaboration circle profiles which are associated with the request recipient 120. As described in relation to FIG. 3, a request recipient 120 may be a member of one or more collaboration circles 125. In addition, a request recipient 120 may be a member of a collaboration circle 125 such that the request recipient 120 is the sole or only member of the collaboration circle 125. As a member of a collaboration circle 125, the request recipient 120 may be associated with a collaboration circle profile, such as collaboration circle profile 305 associated with request recipient 120A. The collaboration circle profile 305 may include an availability status or presence for the request recipient 120A in regard to one or more collaboration circles of which the request recipient 120A is a member. The availability status may then be applied in regard to further processing a communication request for an intended request recipient. In some implementations, the availability status for the request recipient 120 may be determined based on specific time frames identified in one or more of the collaboration circle profiles associated with the request recipient 120. In some implementations, the availability status for the request recipient may be determined based on one or more predictive models 242 derived from a machine learning process.

Next in step 740, in response to determining that a communication request is received from an internal request initiator 105 (e.g., within the same organization, business unit, and/or collaboration circle as an intended request recipient 120), the server 115 may further (as shown by the dashed lines of step 740) determine the availability status for the request recipient based on a collaboration circle profile for at least one collaboration circle for which the request initiator 105 or the request facilitator 140 and the request recipient are both members. For example, if a communication request is received from Sales team member 105A and is intended for request recipient 120B, the server 115 may utilize the availability status or presence data provided in the collaboration circle profile 310 shown in FIG. 3 and determine that for internal communication requests, request recipient 120B's availability status for internal communication requests is configured to be public between 9 am and 5 pm.

Next in step 750, the server 115 determines a request facilitator associated with the request recipient based on the availability status of the request recipient. Based on the availability status or presence settings of the request recipient 120 that are configured in the collaboration circle profile, the server 115 may determine a request facilitator to receive a communication request from the request initiator 105 when an intended request recipient 420 is unavailable to receive the communication request 105. For example, as shown in FIGS. 3 and 4, recipients 120C and 120D are both members of the Support team as identified by their membership in collaboration circle membership 125B and their respective collaboration circle profiles 315 and 320. A communication request intended for request recipient 120C will not be completed because request recipient 120C is currently unavailable. Request recipient 120D would be determined as a request facilitator to receive a communication notification 130 in regard to the communication request 105 because request recipient 120D is also a member of the Support team and is currently available. In some implementations, the availability status of the request recipient may be determined based on collaboration circle profile data for at least one collaboration circle in which the request recipient and the request facilitator are both members. In some implementations, the availability status of the request recipient may be determined based on collaboration circle profile data associated with a collaboration circle which includes the request recipient as the only member.

As further shown in FIG. 7, in step 760 the server 115 determines one or more notification preferences associated with the request facilitator. Based on determining the request facilitator in step 750, the server 115 may determine the notification preferences for the request facilitator. Continuing the example introduced above in regard to step 750, the server 115 may determine that recipient 120D (e.g., who is a member of the Support team identified by collaboration circle 125 and currently has an availability status or presence of "available") prefers to receive push notifications (e.g., request notification 130D). In some implementations, notification preferences may be settings or preferences that are stored in collaboration circle profiles. In some implementations, notification preferences may be settings or preferences that are stored in recipient data module 234. In some implementations, the predictive models 242 may determine notification preferences using historical data stored in history module 234. For example, the historical data may identify what form of request notification 130 was preferred by recipient 120 in regard to a communication request received from request initiator 105. A preferred request notification may include a request notification 130 that a request recipient 120 took action on to receive the communication request and thereby implement the communication request resolution.

The process ends in step 770, where the server 115 generates a communication request notification 130 to the request facilitator 425 based on the one or more notification preferences. The server 115 may generate and forward a variety of request notifications 130 based on the notification preferences of the request facilitator. For example, the request notifications 130 may include one or more of a telephone call, an email message, a text message, a video call, an audio note, a video collaboration session, a meeting invitation, or a push notification. As shown in FIG. 4, the request facilitator 425 (e.g., request recipient 120A) may have notification preferences set to receive a video collaboration session 130A as a notification message 130. Upon receiving the forwarded notification message 130A, the request facilitator 425 may take action to accept or otherwise conduct or participate in the video collaboration session 130A and thereby implement the communication request resolution that was generated by server 115 and completing the communication experience with the request initiator 105.

Figure 8:
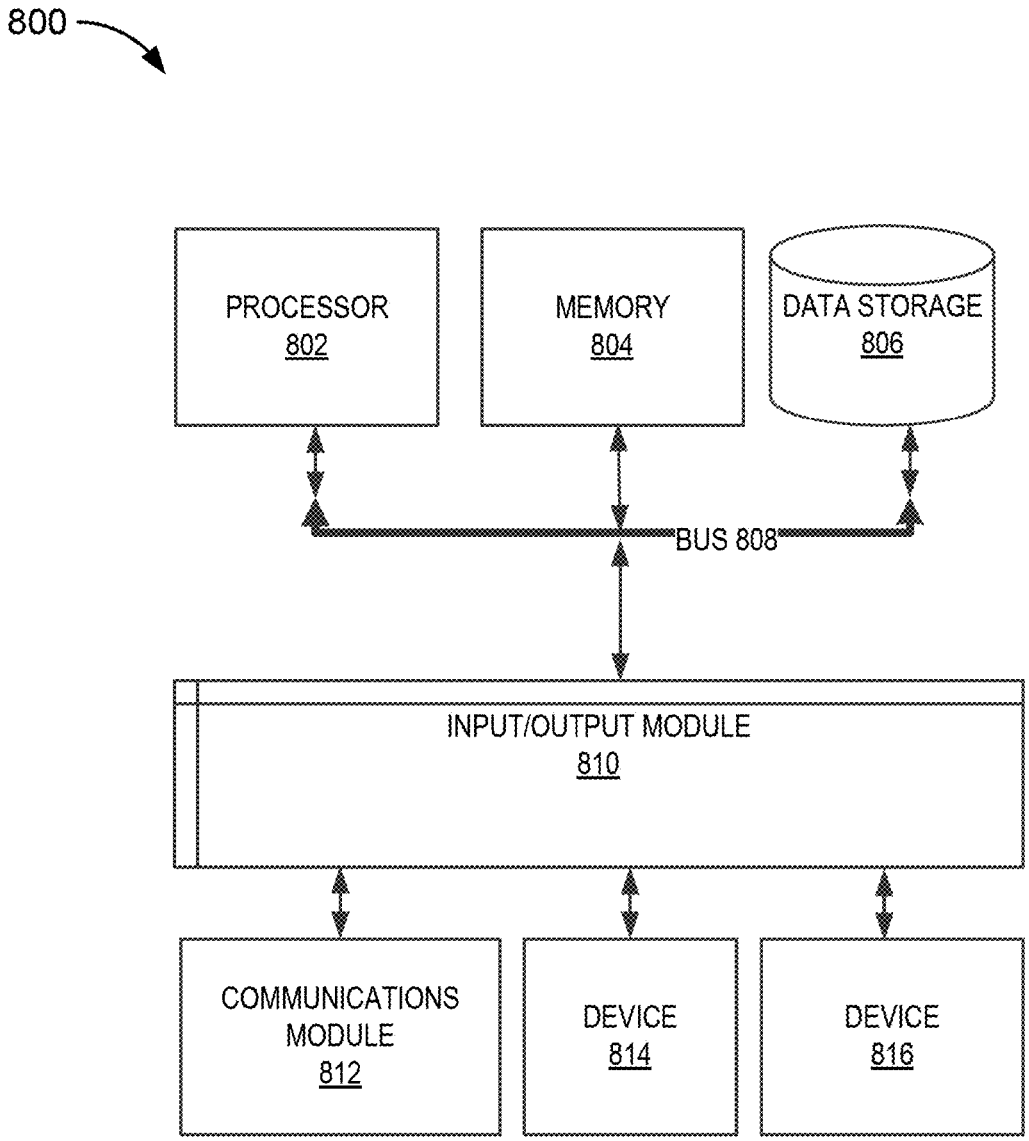
FIG. 8 is a block diagram illustrating an example computer system with which the example server of FIG. 1 can be implemented.

FIG. 8 is a block diagram illustrating an example computer system 800 with which the server 110 of FIG. 1 can be implemented. In certain aspects, the computer system 800 may be implemented using hardware or a combination of software and hardware, either in a dedicated server, or integrated into another entity, or distributed across multiple entities. In some implementations, the computer system 800 may also include one or more computing devices utilized by Initiators 405 of FIG. 4 to initiate a communication request. Additionally, or alternatively, in some implementations, the computer system 800 may also include one or more computing devices utilized by the Recipients 420 of FIG. 4 to receive a communication request notification 425.

Computer system 800 (e.g., server 110) includes a bus 808 or other communication mechanism for communicating information, and a processor 802 (e.g., processor 220 of FIG. 2) coupled with bus 808 for processing information. According to one aspect, the computer system 800 can be a cloud computing server of an IaaS that is able to support PaaS and SaaS services. According to one aspect, the computer system 800 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques. By way of example, the computer system 800 may be implemented with one or more processors 802.

Processor 802 may be a general-purpose microprocessor, a microcontroller, a Digital Signal Processor (DSP), an ASIC, an FPGA, a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory (e.g., memory 804), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry. Expansion memory may also be provided and connected to computer system 800 through input/output module 810, which may include, for example, a SIMM (Single In-Line Memory Module) card interface. Such expansion memory may provide extra storage space for computer system 800, or may also store applications or other information for computer system 800. Specifically, expansion memory may include instructions to carry out or supplement the processes described above, and may include secure information also. Thus, for example, expansion memory may be provided as a security module for computer system 800, and may be programmed with instructions that permit secure use of computer system 800. In addition, secure applications may be provided via the SIMM cards, along with additional information, such as placing identifying information on the SIMM card in a non-hackable manner.

The instructions may be stored in the memory 804 and implemented in one or more computer program products, e.g., one or more modules of computer program instructions encoded on a computer readable medium for execution by, or to control the operation of, the computer system 800, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multi-paradigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices (e.g., device 814 or device 816. The input/output module 810 can be any input/output module. Example input/output modules 810 include data ports such as USB ports. In addition, input/output modules 810 may be provided in communication with processor 802, so as to enable near area communication of computer system 800 with other devices. The input/output module 802 may provide, for example, for wired communication in some implementations, or for wireless communication in other implementations, and multiple interfaces may also be used. The input/output module 810 is configured to connect to a communications module 812. Exemplary communications modules may include networking interface cards, such as Ethernet cards and modems).

The components of the system can be interconnected by any form or medium of digital data communication, e.g., a communication network. The communication network (e.g., communication network 210 of FIG. 2) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 812 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS), CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 812 sends and receives electrical, electromagnetic, or optical signals that carry digital data streams representing various types of information. The network link typically provides data communication through one or more networks to other data devices. For example, the network link of the communications module 812 may provide a connection through a local network to a host computer or to data equipment operated by an Internet Service Provider (ISP). The ISP in turn provides data communication services through the world wide packet data communication network now commonly referred to as the "Internet." The local network and Internet both use electrical, electromagnetic, or optical signals that carry digital data streams. The signals through the various networks and the signals on the network link and through communications module 812, which carry the digital data to and from computer system 800, are example forms of transmission media.

Computer system 800 can send messages and receive data, including program code, through the network(s), the network link, and communications module 812. In the Internet example, a server might transmit a requested code for an application program through the Internet, the ISP, the local network, and communications module 812. The received code may be executed by processor 802 as it is received, and/or stored in data storage 806 for later execution.

In certain aspects, the input/output module 810 is configured to connect to a plurality of devices, such as an input device 814 and an output device 816. Example input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 816 include display devices, such as an LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 816 may comprise appropriate circuitry for driving the output device 816 to present graphical and other information to a user.

According to one aspect of the present disclosure, the server 110 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. Processor 802 may process the executable instructions and/or data structures by remotely accessing the computer program product, for example, by downloading the executable instructions and/or data structures from a remote server through communications module 812 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects, a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

Computing system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 802 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 806. Volatile media include dynamic memory, such as memory 804. Transmission media include coaxial cables, copper wire, and fiber optics, including the wires that comprise bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire, and fiber optics, including the wires that comprise bus 708. Transmission media can also take the form of acoustic or light waves, such as those generated during radio-wave and infra-red data communications. Furthermore, as used in this specification of this application, the terms "computer," "server," "processor," and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted that the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for distributing communication requests based on collaboration circle membership data using machine learning, the method comprising:

receiving a plurality of communication requests, each communication request including a request initiator and a request recipient;

processing the plurality of communication requests using one or more predictive models derived from at least one machine learning process to generate a communication request resolution for each of the plurality of communication requests, wherein generating the communication request resolution further comprises:

determining the request initiator and the request recipient, the request recipient being a member of one or more collaboration circles;

determining an availability status of the request recipient, wherein the availability status of the request recipient is included in one or more collaboration circle profiles associated with the request recipient;

determining a request facilitator associated with the request recipient based on the availability status of the request recipient;

determining one or more notification preferences associated with the request facilitator;

generating a communication request notification for the request facilitator based on the one or more notification preferences and based on historical communication patterns between the request facilitator and the request initiator; and forwarding the communication request notification to the request facilitator to implement the generated communication request resolution.

2. The computer-implemented method of claim 1, wherein each of the plurality of communication requests comprises one of a telephone call, an email message, a text message, a video call, an audio note, a video collaboration session, a meeting invitation, or a push notification.

3. The computer-implemented method of claim 1, wherein the communication request notification comprises one or more of a telephone call, an email message, a text message, a video call, an audio note, a video collaboration session, a meeting invitation, or a push notification.

4. The computer-implemented method of claim 1, wherein determining the request initiator further comprises:

determining if the request initiator is identifiable in one or more aggregated data sources based on a frequency or a recency of the request initiator's interaction with at least one of the one or more aggregated data sources.

5. The computer-implemented method of claim 4, wherein the one or more aggregated data sources include live or historical communication pattern data associated with a customer relationship management tool data source, a social network data source, a support ticketing platform data source, a customer support data source, a call history data source, a chat history data source, a calendar data source, a voicemail data source, or a caller ID name database.

6. The computer-implemented method of claim 4, wherein the one or more predictive models derived from at least one machine learning process are trained based on the one or more aggregated data sources.

7. The computer-implemented method of claim 1, wherein the one or more predictive models derived from at least one machine learning process include a first model associated with communication patterns of a request recipient and a second model associated with communication patterns of all request recipients within an organization or all request recipients within a collaboration circle.

8. The computer-implemented method of claim 1, further comprising determining the availability status for the request recipient based on a collaboration circle profile for at least one collaboration circle for which the request initiator or the request facilitator and the request recipient are members.

9. The computer-implemented method of claim 1, wherein the availability status of the request recipient is determined based on specific time frames identified in one or more collaboration circle profiles associated with the request recipient.

10. The computer-implemented method of claim 1, wherein the availability status for the request recipient is determined based on one or more predictive models derived from at least one machine learning process.

11. A system for distributing communication requests based on collaboration circle membership data using machine learning, the system comprising:

a memory comprising instructions; and one or more processors configured to execute instructions, which, when executed, cause the one or more processors to:

receive a plurality of communication requests, each communication request including a request initiator and a request recipient;

process the plurality of communication requests using one or more predictive models derived from at least one machine learning process to generate a communication request resolution for each of the plurality of communication requests, wherein generating the communication request resolution further comprises:

determining the request initiator and the request recipient, the request recipient being a member of one or more collaboration circles;

determining an availability status of the request recipient, wherein the availability status of the request recipient is included in one or more collaboration circle profiles associated with the request recipient;

determining a request facilitator associated with the request recipient based on the availability status of the request recipient;

determining one or more notification preferences associated with the request facilitator;

generating a communication request notification for the request facilitator based on the one or more notification preferences and based on historical communication patterns between the request facilitator and the request initiator; and forwarding the communication request notification to the request facilitator to implement the generated communication request resolution.

12. The system of claim 11, wherein each of the plurality of communication requests comprises one of a telephone call, an email, an instant message, a text message, a video call, an audio note, a video collaboration session, or a push notification.

13. The system of claim 11, wherein a communication request notification comprises one or more of a telephone call, an email, an instant message, a text message, a video call, an audio note, a video collaboration session, or a push notification.

14. The system of claim 11, wherein the one or more processors are further configured to execute instructions, which, when executed, cause the one or more processors to determine if the request initiator is identifiable in one or more aggregated data sources based on a frequency or a recency of the request initiator's interaction with at least one of the one or more aggregated data sources.

15. The system of claim 14, wherein the one or more aggregated data sources include live or historical communication pattern data associated with a customer relationship management tool data source, a social network data source, a support ticketing platform data source, a customer support data source, a call history data source, a chat history data source, a calendar data source, a voicemail data source, or a caller ID name database.

16. The system of claim 14, wherein the one or more predictive models derived from at least one machine learning process are trained based on the one or more aggregated data sources.

17. The system of claim 11, wherein the one or more predictive models derived from at least one machine learning process include a first model associated with request recipient communication patterns and a second model associated with collaboration circle member communication patterns.

18. The system of claim 11, wherein the one or more processors are further configured to execute instructions, which, when executed, cause the one or more processors to determine the availability status for the request recipient based on a collaboration circle profile for at least one collaboration circle for which the request initiator or the request facilitator and the request recipient are members.

19. The system of claim 11, wherein the availability status for the request recipient is determined based on one or more predictive models derived from at least one machine learning process.

20. A non-transitory machine readable storage medium containing program instructions for distributing communication requests based on collaboration circle membership data using machine learning, the program instructions executable by one or more processors to perform operations comprising:

receiving a plurality of communication requests, each communication request including a request initiator and a request recipient;

processing the plurality of communication requests using one or more predictive models derived from at least one machine learning process to generate a communication request resolution for each of the plurality of communication requests, wherein generating the communication request resolution further comprises:

determining the request initiator and the request recipient, the request recipient being a member of one or more collaboration circles;

determining an availability status of the request recipient, wherein the availability status of the request recipient is included in one or more collaboration circle profiles associated with the request recipient;

determining a request facilitator associated with the request recipient based on the availability status of the request recipient;

determining one or more notification preferences associated with the request facilitator;

generating a communication request notification for the request facilitator based on the one or more notification preferences and based on historical communication patterns between the request facilitator and the request initiator; and forwarding the communication request notification to the request facilitator to implement the generated communication request resolution.

*21. An apparatus comprising:*

*a set of one or more servers, including one or more processors and communications circuitry to provide a communications platform, to provide communications services and to receive a plurality of communication requests, each communication request involving a request recipient corresponding to one or more collaboration circles and further involving a request initiator;*

*the one or more processors:*

*to use a machine learning process to train one or more predictive models based on an aggregation of data corresponding to historical communications involving the request initiator and, in response, to generate a communication request resolution corresponding to the request recipient being associated with the one or more collaboration circles and to an availability status of the request recipient; and*

*to generate a communication request notification based on historical communication patterns between a request facilitator and the request initiator; and*

*the communications circuitry to, for each of the plurality of communication requests, send the communication request notification to the request facilitator, wherein the communication request notification is processed based on one or more notification preferences associated with the request facilitator, and the machine learning process is to train one or more predictive models based on patterns identifiable from the aggregation of data.*

*22. The apparatus of claim 21, wherein at least some of the historical communications are derived from the communications services provided by the communications platform.*

*23. The apparatus of claim 21, wherein the set of one or more servers includes a plurality of servers to provide the communications platform as a cloud-computing server in which the plurality of servers is communicatively interconnected by a communication network.*

*24. The apparatus of claim 21, wherein the communications platform is implemented to provide and support the communications services as PaaS (platform-as-a-service) type services.*

* * * * *